(12) United States Patent
Harada et al.

(10) Patent No.: US 6,633,926 B1
(45) Date of Patent: Oct. 14, 2003

(54) DMA TRANSFER DEVICE CAPABLE OF HIGH-SPEED CONSECUTIVE ACCESS TO PAGES IN A MEMORY

(75) Inventors: Masaaki Harada, Moriguchi (JP); Tsutomu Sekibe, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/450,873

(22) Filed: Nov. 29, 1999

(30) Foreign Application Priority Data

Nov. 30, 1998 (JP) ............................................ 10-338739

(51) Int. Cl.[7] .............................................. G06F 13/00
(52) U.S. Cl. .............................. 710/22; 710/5; 710/40; 710/52; 710/111; 710/308
(58) Field of Search ........................... 710/22–28, 308, 710/5–7, 40–45, 52–57, 307–310, 107–111

(56) References Cited

U.S. PATENT DOCUMENTS

| 4,912,632 A | | 3/1990 | Gach et al. |
| 5,159,679 A | | 10/1992 | Culley |
| 5,179,709 A | | 1/1993 | Bailey et al. |
| 5,313,610 A | * | 5/1994 | Oliver et al. ................ 395/425 |
| 5,347,634 A | | 9/1994 | Herrell et al. |
| 5,623,697 A | * | 4/1997 | Bland et al. ................. 395/842 |
| 5,630,096 A | | 5/1997 | Zuravieff et al. |
| 5,715,476 A | | 2/1998 | Kundu et al. |
| 5,944,800 A | * | 8/1999 | Mattheis et al. .............. 710/23 |
| 5,948,080 A | * | 9/1999 | Baker .......................... 710/37 |
| 6,065,071 A | * | 5/2000 | Priem et al. .................. 710/22 |
| 6,111,592 A | * | 8/2000 | Yagi ........................... 345/511 |

FOREIGN PATENT DOCUMENTS

| EP | 0803821 | 10/1997 |
| JP | 275049 | 3/1990 |
| JP | 635841 | 2/1994 |
| JP | 661074 | 8/1994 |
| JP | 736821 | 2/1995 |
| JP | 724045 | 3/1995 |
| JP | 1040211 | 2/1998 |

* cited by examiner

Primary Examiner—Christopher B. Shin

(57) ABSTRACT

A DMA transfer device transfers data from a first region to a second region in a memory allowing high-speed page access. The DMA transfer device includes: a first detecting unit for detecting a plurality of read areas that form the first region, each read area being located between page boundaries; a second detecting unit for detecting a plurality of write areas that form the second region, each write area being located between page boundaries; and an access unit for performing high-speed page access to each of the read areas and each of the write areas.

14 Claims, 19 Drawing Sheets

FIG. 6

| REMAIN_R_A_201[3:0] | SUBTRACTION RESULT (A) |
|---|---|
| 0 | 10(16 BYTE) |
| 4 | 0C(12 BYTE) |
| 8 | 08 |
| C | 04 |

FIG. 8

| REMAIN_W_A_301[3:0] | SUBTRACTION RESULT(A) |
|---|---|
| 0 | 10(16 BYTE) |
| 4 | C(12 BYTE) |
| 8 | 8 |
| C | 4 |

DMA TRANSFER DEVICE CAPABLE OF HIGH-SPEED CONSECUTIVE ACCESS TO PAGES IN A MEMORY

BACKGROUND OF THE INVENTION (1) Field of the Invention

The present invention relates to a direct memory access (DMA) transfer device that is capable of DMA transfer to/from a memory that can be accessed in page units at high speed.

(2) Description of the Related Art

A DMA transfer device transfers data between/within memories or between a memory and an input/output (I/O) device at high speed.

To perform DMA transfer between memories connected to the same bus or between different storage regions in the same memory, the DMA transfer device reads data from one storage region (hereafter called a "read region"), temporarily places the read data in a buffer in the DMA transfer device, and writes the data from the buffer into another storage region (hereafter called a "write region"). This buffer has a capacity equal to or larger than the data that can be transferred through one access to the memory. Hereafter, the size of data to be transferred though one access to a storage region is called the "access data size". Typical conventional DMA transfer devices read, buffer, and write data in units of the access data size. By doing so, the buffer size can be minimized.

If a DMA transfer device has a buffer capacity of an integral multiple of the access data size, the device will first perform repeated accesses to the read region to read and buffer an amount of data equal to the buffer capacity, before performing repeated accesses to write this data into the write region.

In recent years, Synchronous Dynamic RAM (SDRAM) that can be accessed in page units at high speed is widely used as main memory. Here, a "page" refers to a group of consecutive locations in a memory that holds a predetermined amount of data, and a high-speed access to consecutive addresses within a page is hereafter called a "high-speed page access". Conventional DMA transfer devices, however, access SDRAM using the access data size or buffer size as described above, not page units, and so cannot make the most of the high-speed performance of SDRAM.

SUMMARY OF THE INVENTION

The first object of the present invention is to provide a DMA transfer device which, by performing high-speed access, makes full use of the page access capability of a memory.

The second object of the present invention is to provide a DMA transfer device that can perform data transfer at high speed by rationally dividing up a region to be accessed.

The third object is to provide a DMA transfer device suited to accessing a memory allowing high-speed page access.

The fourth object is to provide a DMA transfer device that can suspend, when a DMA transfer request of a higher priority is issued during a DMA transfer of a lower priority, the lower-priority DMA transfer to perform the higher-priority DMA transfer, and that can reduce the idle time of buses used by DMA transfer.

In order to achieve the above first to third objects, a DMA transfer device of the present invention accesses a region in a memory allowing high-speed page access, the DMA transfer device including a detecting unit for detecting access areas that form the region to be accessed, each access area being demarcated by a page boundary and one of: (1) a start of the region; (2) an end of the region; and (3) another page boundary, and an access unit for performing high-speed page access to each access area.

With this construction, when at least one of the read and write regions exists in a memory allowing high-speed page access, the DMA transfer device can perform high-speed page access to each access area between page boundaries in the read/write region. Accordingly, the present DMA transfer device can make full use of the page access capability of the memory, reduce the idle time of buses, and reduce the time taken by the entire DMA transfer.

Here, the detecting unit may include: an address updating unit for storing an access address whose initial value is a start address of the region to be accessed and for updating the access address, whenever the access unit has performed an access, to a start address of a remaining part of the region to be accessed; a remaining data size updating unit for storing a remaining data size whose initial value is a data size of the region to be accessed and for updating the remaining data size, whenever the access unit has performed an access, to a data size of the remaining part of the region to be accessed; and an access area detecting unit for detecting an access area as an area from the access address to a next page boundary when the access address is set at the initial value and for otherwise detecting an access area as an area from the access address to either a next page boundary or the end of the region to be accessed.

With this construction, the DMA transfer device can detect an access area that can be one of: an area from the access address at the start of the region to be accessed to the next page boundary; an area from the page boundary to the next page boundary; ... and an area from a page boundary to the end of the region one by one while at the same time having the access unit perform high-speed page access to a detected access area.

Here, the access area detecting unit may include a size detecting unit for detecting a size of an area from the access address in the address updating unit to either the next page boundary or the end of the region, and a size storing unit for storing the detected area size as a size of the access area. The access unit may perform high-speed page access to the area of the access area size in the size storing unit, starting from the access address in the address updating unit.

For this construction, the access unit can be supplied with suitable parameters for high speed access due to the access area detecting unit detecting access areas as combinations of a start address and a size of the access area.

Here, the size detecting unit may include: a subtracting unit for subtracting a value, which is indicated by lower bits of the access address and shows a relative position of the access address within a page in the memory, from a page size of each page to produce a subtraction result; a comparing unit for comparing the subtraction result with the remaining data size to produce a comparison result; and a selecting unit for selecting, based on the comparison result, one of the subtraction result and the remaining data size to give a smallest selection result, wherein the size storing unit may store the selection result as the access area size.

With this construction, the size detecting unit can detect an access area size using only a simple construction that performs a subtraction and a comparison.

The first to third objects can be also achieved by a DMA transfer device that transfers data from a first region to a second region in memories that allow high-speed page access, the DMA transfer device including: a first detecting unit for detecting a plurality of read areas that form the first region, each read area being demarcated by a page boundary and one of: (1) a start of the first region; (2) an end of the first region; and (3) another page boundary; a second detecting unit for detecting a plurality of write areas that form the second region, each write area being demarcated by a page boundary and one of: (1) a start of the second region; (2) an end of the second region; and (3) another page boundary; a buffer unit for temporarily storing data to be transferred; and an access unit for performing high-speed page access to each of the read areas and each of the write areas.

When both the read (first) and write (second) regions exist in a memory or memories allowing high-speed page access, the DMA transfer device can perform high-speed page access to each read area between page boundaries in the read region and to each write area in the write region. As a result, idle time of buses can be reduced, and therefore the entire DMA transfer can be quickly performed.

Here, the first region and the second region may exist in either in a same memory or different memories connected to a same bus, wherein the access unit may include a read/write judging unit for comparing a size of data in the buffer unit with a size of a next write area and producing a judgement result showing whether a read from a next read area or a write into the next write area should be performed and an access control unit for performing either the read or the write according to the judgement result of the read/write judging unit.

For this construction, the DMA transfer device can read data from and write data into the first and second regions by performing high-speed page access to each read/write area. In addition, the buffer unit only needs a capacity of two pages minus one word of the memory. In this way, the present DMA transfer device can efficiently perform DMA transfer using a buffer of a minimum size.

Here, the buffer unit may be a two-port memory, one port being connected to one bus and the other port being connected to a different bus, and the first region and the second region may exist in different memories connected to the different buses. The access unit may include a read/write judging unit for judging from a size of data in the buffer unit whether to perform a read from a next read area, and separately judging whether to perform a write into a next write area and an access control unit for performing the read and the write according to judgements of the read/write judging unit.

With this construction, when the first and second regions exist in different memories connected to different buses, the DMA transfer device can perform a read from one read area between page boundaries in the read region to the buffer unit in parallel with a write from the buffer unit to one write area in the write region. In addition, the present DMA transfer device can efficiently perform DMA transfer using a buffer of a minimum size.

The first to fourth objects can be achieved by a DMA transfer system that accesses regions in a memory allowing high-speed page access and that has a plurality of DMA channels of different priorities. The DMA transfer system includes: a plurality of receiving units that are each provided to a different DMA channel, each receiving unit receiving a DMA transfer request for one DMA channel and storing the DMA transfer request until a DMA transfer requested by the DMA transfer request is completed; a plurality of detecting units that are each provided to a different DMA channel, each detecting unit detecting a plurality of access areas that form one of the regions that is specified by a DMA transfer request corresponding to the detecting unit, each access area being demarcated by a page boundary and one of: (1) a start of the region; (2) an end of the region; and (3) another page boundary; a plurality of request generating units that are each provided to a different DMA channel, each request generating unit generating a plurality of access requests that each indicate high-speed page access to one access area detected by a detecting unit corresponding to the request generating unit; a buffer unit that is shared by the plurality of DMA channels and that temporarily stores data to be transferred; and an arbitration unit for: (1) performing, if only one DMA transfer request for one DMA channel is stored by one receiving unit, high-speed page access according to access requests that have been generated corresponding to the DMA transfer request; (2) instructing, if a DMA transfer request for a DMA channel of a higher priority is received by one receiving unit while a DMA transfer request of a lower priority is stored by another receiving unit, a detecting unit and a request generating unit corresponding to the DMA transfer request of the lower priority to suspend processing once the buffer unit is empty; (3) starting, once the buffer unit is empty, the DMA transfer of the higher priority according to each access request; and (4) instructing, once the DMA transfer of the higher priority is completed, the detecting unit and the request generating unit whose processing was suspended to resume the processing.

For this construction, the DMA transfer system can perform high-speed page access to each access area between page boundaries in a memory region and can suspend, if a high-priority DMA transfer request is received during a lower-priority DMA transfer, the lower-priority DMA transfer to perform the higher-priority DMA transfer.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows subtraction results that have been produced by subtracting lower four bits of a start address of a remaining part of the read region from a constant corresponding to one page size and that each indicate the number of bytes existing from the start address to the next page boundary;

FIG. 8 shows subtraction results that have been produced by subtracting lower four bits of a start address of a remaining part of the write region from a constant corresponding to one page size and that each indicate the number of bytes existing from the start address to the next page boundary;

DESCRIPTION OF THE PREFERRED EMBODIMENTS

First Embodiment
Construction of Information Processing Apparatus

Figure 1:
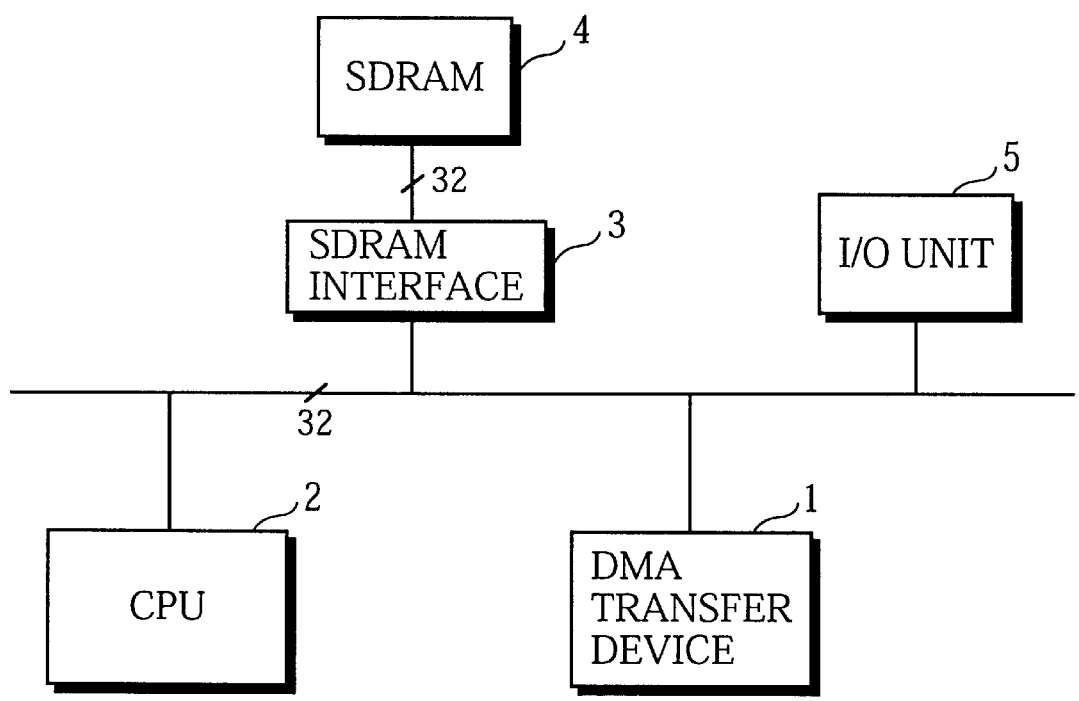
FIG. 1 is a block diagram block diagram showing the construction of a principal part of an information processing apparatus including a DMA transfer device 1 according to the first embodiment of the present invention.

FIG. 1 is a block diagram showing the construction of a principal part of an information processing apparatus including a DMA transfer device 1 of the present invention. This information processing apparatus is a part of a device such as a digital satellite broadcast receiving device (otherwise known as a set top box) or a record/playback device for optical discs such as a Digital Video/Versatile Disc-ROM (DVD-ROM) and a DVD-RAM, and controls overall processing of the device. This information processing apparatus comprises an I/O unit 5, an SDRAM 4, an SDRAM interface 3, a CPU 2, and the DMA transfer device 1.

The I/O unit 5 inputs and outputs an MPEG (Motion Picture Expert Group) stream and receives data from a remote controller (not shown in the figure).

The SDRAM 4 can be accessed at high speed in page units, has a data width of 32 bits (which are equal to one word in this specification), and is divided by 16-byte pages that each can hold four words. Note that the size of one page can be set alternatively as two words, eight words, or the like, but should be preferably equal to the amount of data used by the CPU when updating the content of its cache memory. This simplifies the internal construction of the SDRAM interface 3 as the same circuitry can be used by both the CPU 2 and the DMA transfer device 1. In the present embodiment, cache operations are assumed to be performed in 16-byte units.

The SDRAM interface 3 transfers an address, data, control signals, or the like via a bus from the DMA transfer device 1 or the CPU 2, and converts the received signal and the like into a suitable format for input into the SDRAM 4 before accessing the SDRAM 4.

The CPU 2 contains an internal cache memory and controls the overall processing of the information processing apparatus. The CPU 2 also sets a DMA transfer request in the DMA transfer device 1.

According to this DMA transfer request, the DMA transfer device 1 performs DMA transfer between different storage regions within the SDRAM 4, between the SDRAM 4 and the I/O unit 5, or between the SDRAM 4 and other units such as an MPEG decoder (not shown in FIG. 1).

The DMA transfer device 1 accesses a region in the SDRAM 4 in units of consecutive areas making up the region by detecting such areas between page boundaries and performing high-speed page mode access to each area. Hereafter, the term "area" refers to a storage area detected by a DMA transfer device between page boundaries, and areas from and into which data should be read and written are respectively called read areas and write areas.

Construction of DMA Transfer Device 1

Figure 2:
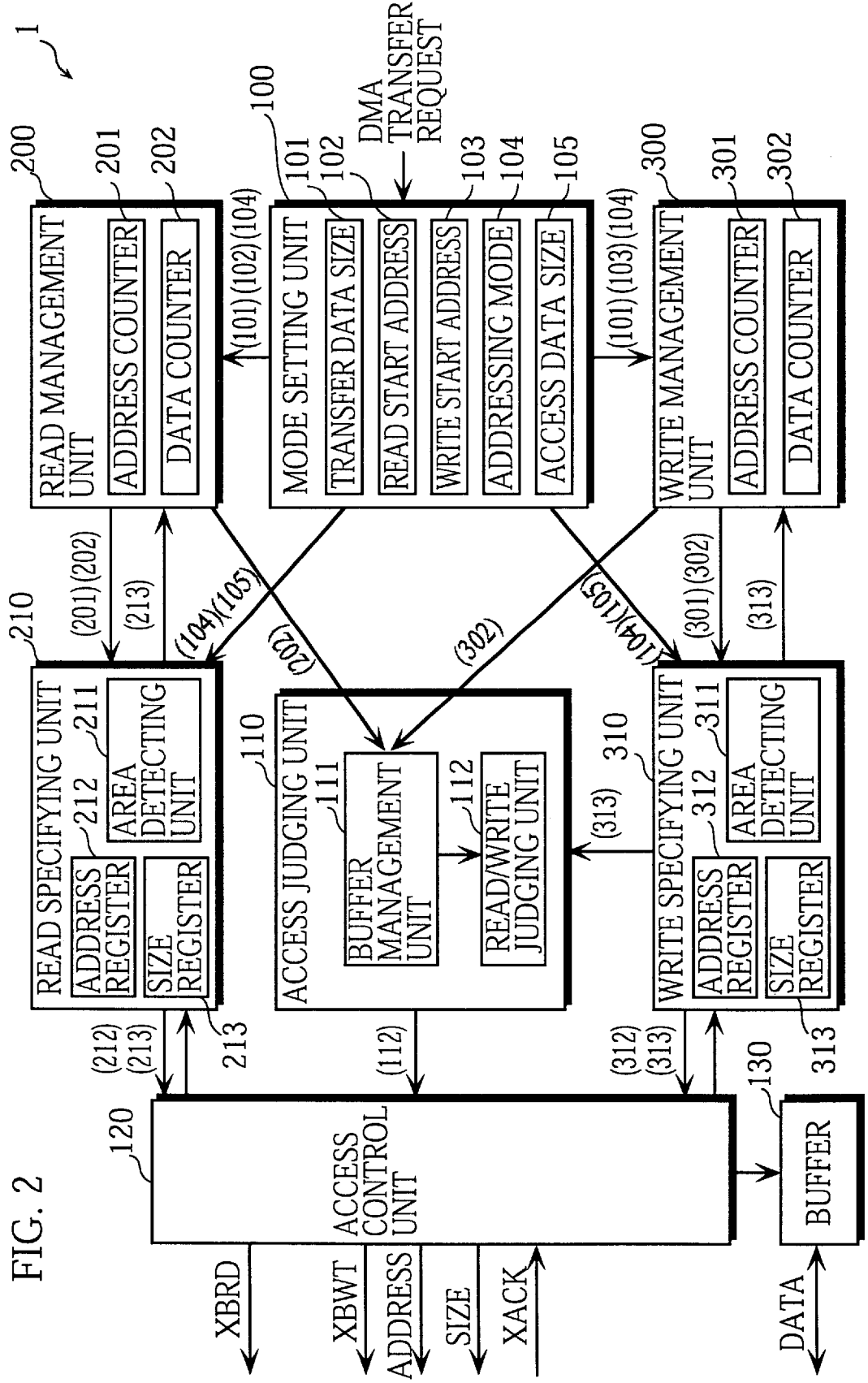
FIG. 2 is a block diagram showing the construction of the DMA transfer device 1.

FIG. 2 is a block diagram showing the construction of the DMA transfer device 1, which includes the following functional units: a mode setting unit 100; a read management unit 200; a read specifying unit 210; a write management unit 300; a write specifying unit 310; an access specifying unit 110; an access control unit 120; and a buffer 130. The number inside parentheses close to each arrow in the figure represents data that is the outputted content of a register, a counter, or a unit assigned the same number.

The mode setting unit 100 contains registers 101–105 for storing the parameters in the DMA transfer request set by the CPU 2. These parameters each indicate the following information on the requested DMA transfer: (1) a transfer data size; (2) a read start address; (3) a write start address; (4) an addressing mode; and (5) an access data size. Here, the transfer data size (1) is the size of data to be transferred in response to the DMA transfer request and is represented by the number of bytes, and the read start address (2) is a start address of a part in the read region in the SDRAM 4, the I/O unit 5, or the like. The write start address (3) is a start address of a part in the write region. The addressing mode (4) indicates whether accesses for the requested DMA transfer are to be performed to consecutive locations in the order of ascending address numbers in the read/write region or to one location with a fixed address. Separate addressing modes are provided for the read region and the write region. Access data sizes (5) are also provided for the read region and the write region and are both 32 bits (one word) for the present embodiment. The registers 101–105 respectively store the above parameters (1)–(5), which are cleared when the requested DMA transfer has been completed. Hereafter, stored contents of registers 101–103 are shown as TRANSFER_SIZE_101, SRC_A_102, and DST_A_103.

The read management unit 200 manages the start address of the unread data (hereafter "REMAIN_R_A_201") remaining in the read region specified by the SRC_A_102 and TRANSFER_SIZE_101 and the size of this remaining data (hereafter "REMAIN_R_SIZE_202"). To do so, the read management unit 200 is equipped with an address counter 201 and a data counter 202.

The address counter 201 receives the SRC_A_102 from the register 102 after the CPU 2 set a DMA transfer request in the mode setting unit 100, and holds it as the initial value of the REMAIN_R_A_201. If the addressing mode for the requested DMA transfer indicates that access should be performed to different locations in the order of ascending address numbers, the address counter 201 is notified by the read specifying unit 210 of the number of bytes that have been read in the latest access and then updates the REMAIN_R_A_201 by adding this number to the current REMAIN_R_A_201. As a result, the REMAIN_R_A_201 will indicate the start address of a read area from which data should be read. The read specifying unit 210 notifies the address counter 201 of this number of bytes each time the access control unit 120 has read data from the read area and placed the read data in the buffer 130. On the other hand, if the addressing mode indicates that access for the requested DMA transfer is performed to one location with the fixed address, the address counter 201 stores the SRC_A_102 outputted from the register 102 as it is without updating it during the DMA transfer.

The data counter 201 receives the TRANSFER_SIZE_101 from the register 101 when the CPU 2 sets the DMA transfer request in the mode setting unit 100, and holds it as the initial value of the REMAIN_R_SIZE_202. The data counter 202 updates the REMAIN_R_SIZE_202 whenever the read specifying unit 210 notifies it of the read number of bytes, by subtracting the notified number from the REMAIN_R_SIZE_202. As a result, the REMAIN_R_SIZE_202 in the data counter 202 indicates the size of data that remains unread out of data indicated by the TRANSFER_SIZE_101.

The read specifying unit 210 contains an area detecting unit 211, an address register 212, and a size register 213. Once the DMA transfer request has been set in the mode setting unit 100, the read specifying unit 210 detects a read area between page boundaries that exists in a part of the read region, the part being specified by the REMAIN_R_A_201 and REMAIN_R_SIZE_202. The read specifying unit 210 then sets a start address of the detected read area in the address register 212 and the size of the read area in the size register 213. Hereafter, the start address in the address register 212 and the area size in the size register 213 are shown as PARTIAL_R_A_212 and PARTIAL_R_SIZE_213. After this, on receiving a notification from the access control unit 120 indicating that the access control unit 120 has completed a read from the detected read area and placed the read data in the buffer 130, the read specifying unit 210 notifies the read management unit 200 of the PARTIAL_R_SIZE_213 in the size register 213 as read number of bytes. Following this, the read specifying unit 210 detects the next read area and sets the PARTIAL_R_A_212 and PARTIAL_R_SIZE_213 in the address register 212 and the size register 213 accordingly.

Figure 3:
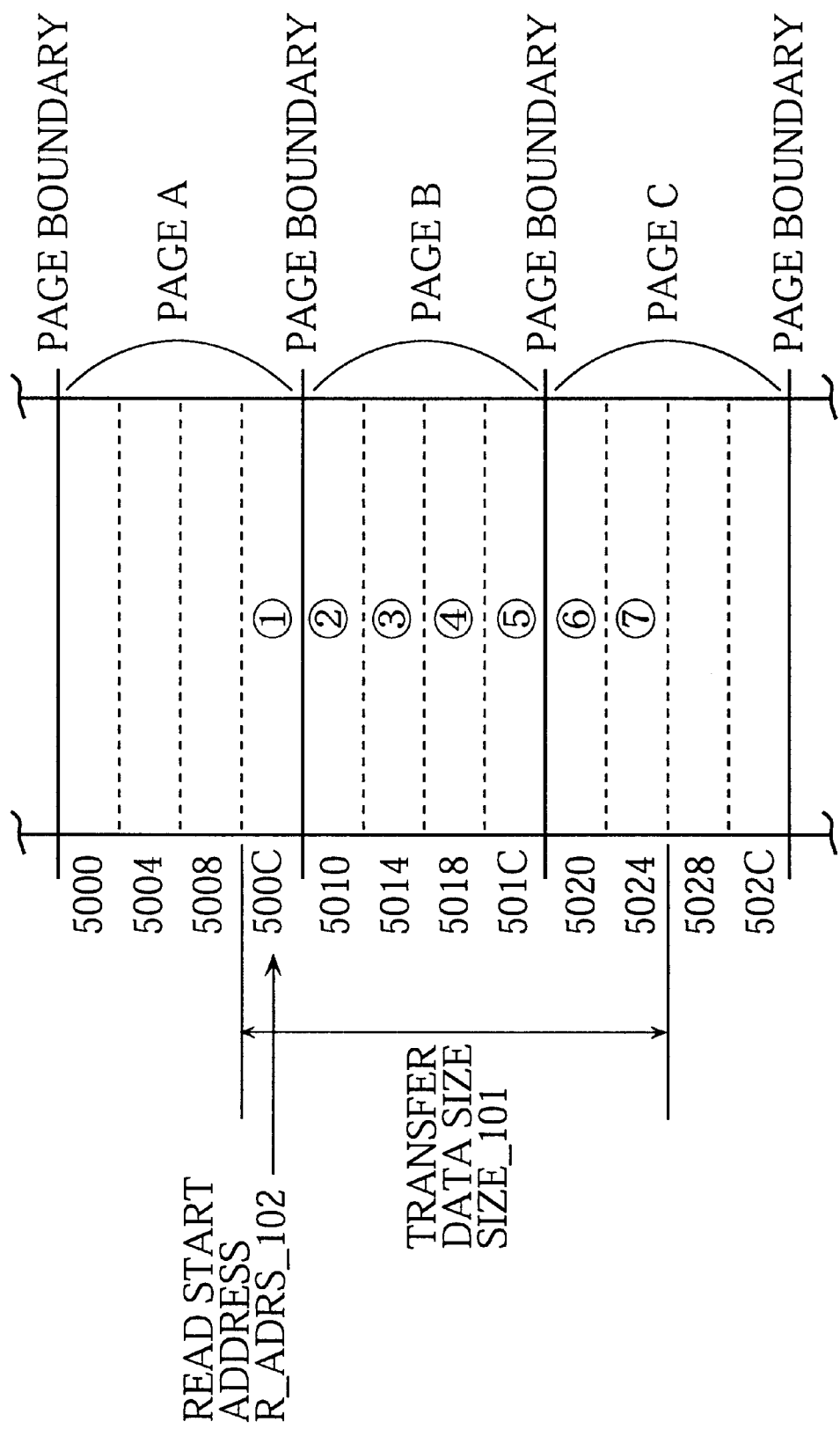
FIG. 3 shows an example of a read region specified by a read specifying unit in the DMA transfer device 1.

FIG. 3 shows examples of read areas detected by the read specifying unit 210. These read areas store seven words represented by ①to ⑦, and exist in a 28-byte read region that starts from the address "500C" (hexadecimal) in the SDRAM 4. When DMA transfer is requested for this data, the SRC_A_102 is set as "500C", and the TRANSFER_SIZE_101 as 28 bytes (seven words). The size of one page in the SDRAM 4 is 16 bytes (four words), and in this case the SDRAM 4 stores the seven words that should be transferred over three pages.

The read region in FIG. 3 is made up of three consecutive read areas which the read specifying unit 210 detects one at a time. The three read areas are composed of a first area represented by (500C,4) which stores word ①, a second area represented by (5010,16) which stores words ② to ⑤, and a third area represented by (5020,8) which stores words ⑥ and ⑦. Here, the first number in the parentheses indicates the start address of each read area (PARTIAL_R_A_212), while the second number indicates the number of bytes (PARTIAL_R_SIZE_213) in the read area. Containing no page boundaries, these read areas are suited to the high-speed page access.

The write management unit 300 manages the start address of a write area (hereafter REMAIN_W_A_301) in a part of the write region, the part being specified by the DST_A_103 and TRANSFER_SIZE_101, and the size of unwritten data (hereafter "REMAIN_W_SIZE_302"). To do so, the write management unit 300 is equipped with an address counter 301 and a data counter 302.

The address counter 301 receives the DST_A_103 from the register 103 after the CPU 2 set the DMA transfer request in the mode setting unit 100, and then holds it as the initial value of the REMAIN_W_A_301. If the addressing mode for the requested DMA transfer indicates that access should be performed to different locations in the ascending order of addresses, the address counter 301 is notified by the write specifying unit 310 of the number of bytes that have been written in the latest access and then updates the REMAIN_W_A_301 by adding this number to the current REMAIN_W_A_301. As a result, the REMAIN_W_A_301 will indicate the start address of the next write area. The write specifying unit 310 notifies the address counter 301 of this number of bytes each time the access control unit 120 has completed the write into the write area. If the addressing mode indicates that access for the requested DMA transfer should be performed to one location with the fixed address, the address counter 301 stores the DST_A_103 outputted from the register 103 as it is without updating it during the DMA transfer.

The data counter 301 receives the TRANSFER_SIZE_101 from the register 101 after the CPU 2 set the DMA transfer request in the mode setting unit 100, and holds it as the initial value of the REMAIN_W_SIZE_302. The data counter 302 updates the REMAIN_W_SIZE_302 whenever the write specifying unit 310 notifies it of the written number of bytes, by subtracting the notified number from the current REMAIN_W_SIZE_302. As a result, the REMAIN_W_SIZE_3020 indicates the size of unwritten data out of data of the TRANSFER_SIZE_101.

The write specifying unit 310 contains an area detecting unit 311, an address register 312, and a size register 313. Once the DMA transfer request has been set in the mode setting unit 100, the write specifying unit 310 detects a write area between page boundaries that exists in the write region specified by the REMAIN_W_A_301 and REMAIN_W_SIZE_302. The write specifying unit 310 then sets the start address of the detected write area in the address register 312 and a size of the write area in the size register 313. The address in the address register 312 and the area size in the size register 313 are shown hereafter as PARTIAL_W_A_312 and PARTIAL_W_SIZE_313. After this, on receiving a notification from the access control unit 120 indicating that the access control unit 120 has completed a write into the detected write area, the write specifying unit 310 notifies the write management unit 300 of the PARTIAL_W_SIZE_313 as written number of bytes. Following this, the write specifying unit 310 detects the next write area in the write region and sets the PARTIAL_W_A_312 and PARTIAL_W_SIZE_313 in the address register 312 and the size register 313 accordingly.

Figure 4:
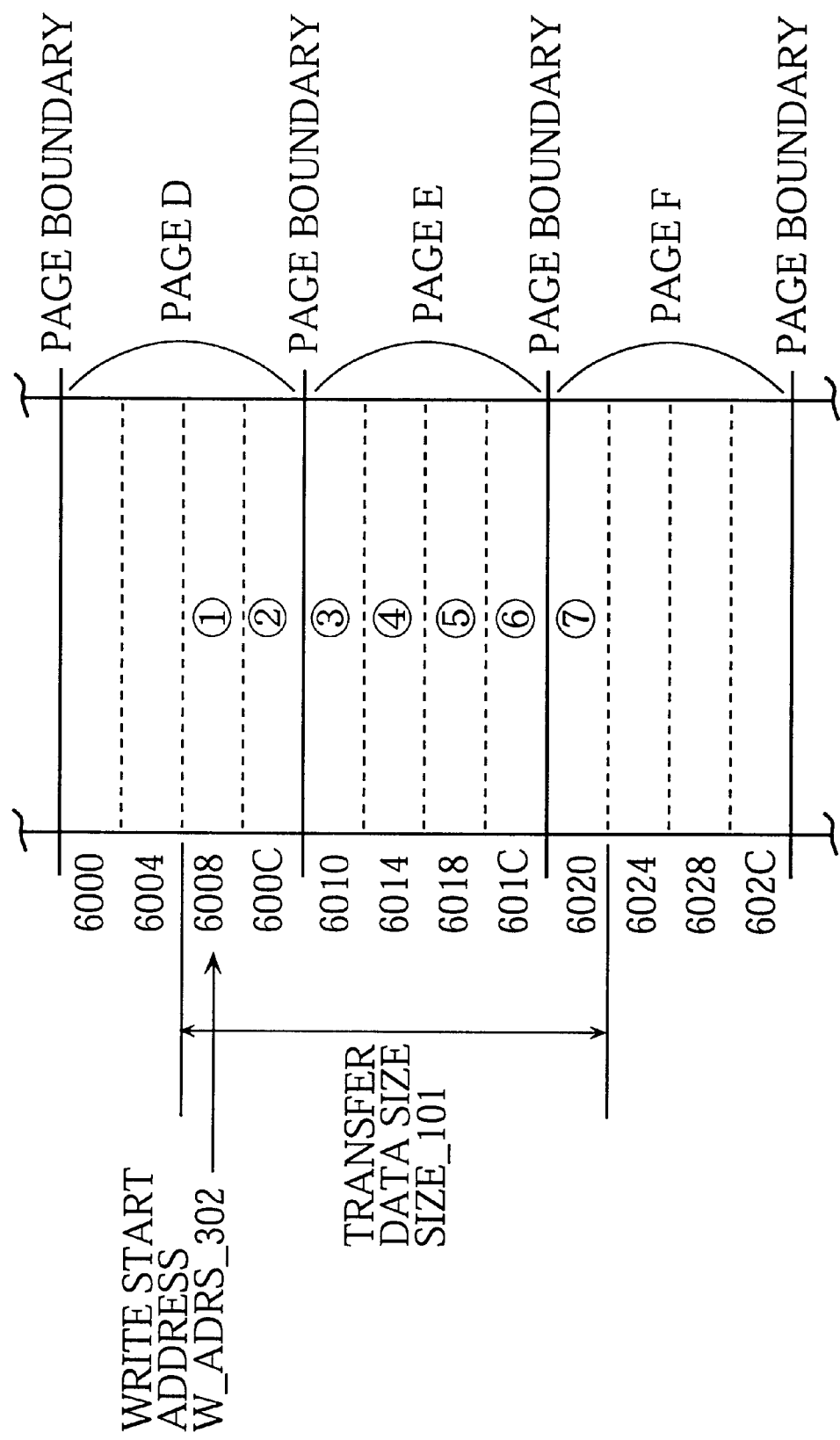
FIG. 4 shows an example of a write region specified by a write specifying unit in the DMA transfer device 1.

FIG. 4 shows examples of write areas detected by the write specifying unit 310 to store seven words represented by ① to ⑦. These write areas exist in a 28-byte write region that starts from the address "6008" (hexadecimal) in the SDRAM 4. When DMA transfer is requested for this data, the DST_A_103 is set as "6008", and the TRANSFER_SIZE_101 as 28 bytes. The size of one page in the SDRAM 4 is 16 bytes (four words), and in this case the SDRAM 4 stores the seven words over three pages.

The write region in FIG. 4 is made up of three consecutive write areas which the write specifying unit 310 detects one at a time. The three write areas are composed of a fourth area represented by (6008,8) which stores words ①　and ②, a fifth area represented by (6110,16) which stores words ③ to ⑥, and a sixth area represented by (6020,4) which stores word ⑦. Here, the first number in the parentheses indicates the PARTIAL_W_A_312, while the second number indicates the PARTIAL_W_SIZE_313. Containing no page boundaries, the three write areas are suited to the high-speed page access.

The access judging unit 110 contains a buffer management unit 111 and a read/write judging unit 112, and judges from the data size stored in the buffer 130 whether the access control unit 120 should perform either a read or a write. Here, a "read" by the access control unit 120 involves reading data from a read area detected by the read specifying unit 210 and placing the read data in the buffer 130, while a "write" involves reading the data from the buffer 130 and writing the read data in a write area detected by the write specifying unit 310.

The buffer management unit 111 receives the REMAIN_R_SIZE_202 and the REMAIN_W_SIZE_302 from the data counters 202 and 302, and calculates the size of data currently in the buffer 130 by subtracting the received REMAIN_W_SIZE_302 from the REMAIN_R_SIZE_202.

If the calculated data size is smaller than the PARTIAL_W_SIZE_313, the read/write judging unit 112 judges that the access control unit 120 should perform a read. If not, the read/write judging unit 112 judges that the access control unit 120 should perform a write.

According to the judgement of the read/write judgement unit 112, the access control unit 120 reads data from a read area detected by the read specifying unit 210 and places the read data in the buffer 130, or reads data from the buffer 130 and writes the read data in a write area detected by the write specifying unit 310.

The buffer 130 temporarily stores data that has been read from a read area. The stored data is cleared after the data has been written into a write area. The size of the buffer 130 is 32 bytes (two pages).

Construction of Area Detecting Unit 211

Figure 5:
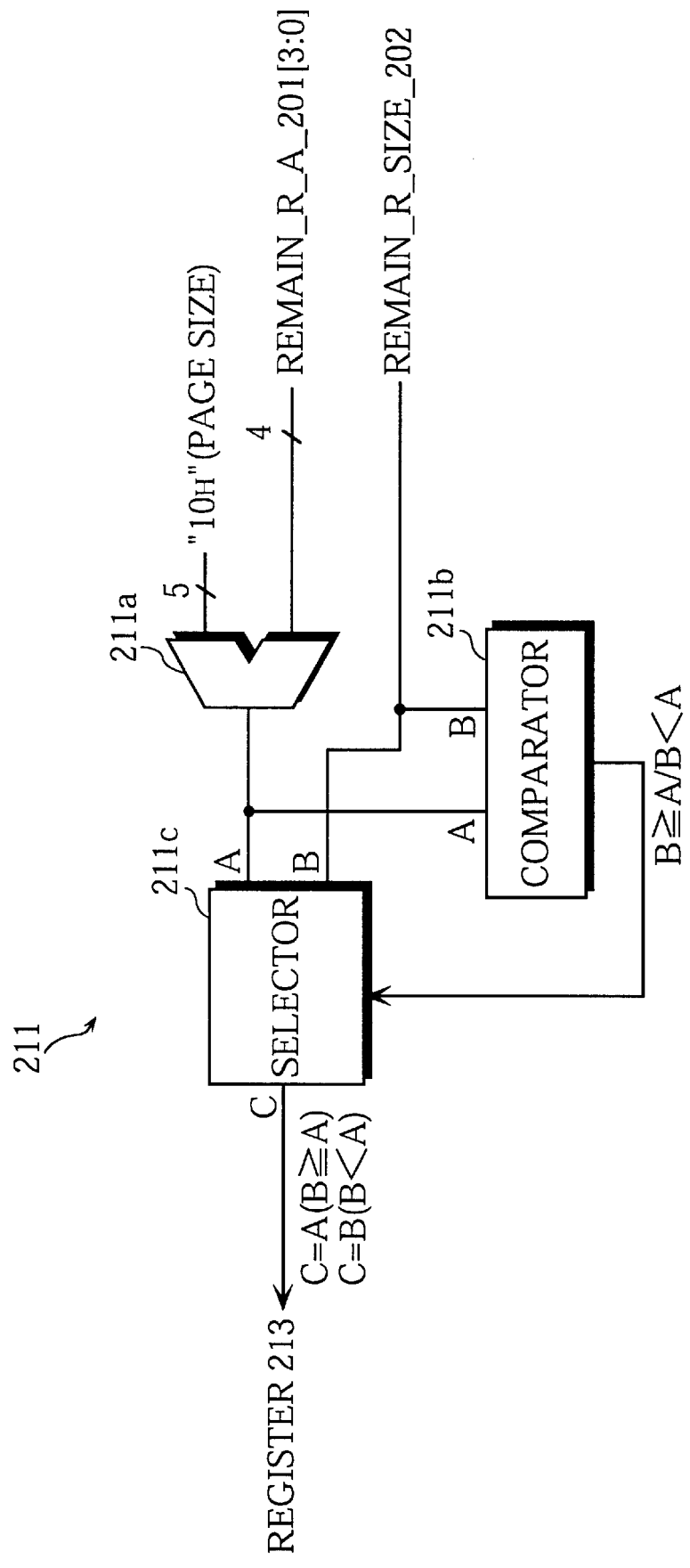
FIG. 5 is a block diagram showing an example of the detailed construction of an area detecting unit in the DMA transfer device 1.

FIG. 5 is a block diagram showing the detailed construction of the area detecting unit 211 that contains a subtracter 211a, a comparator 211b, and a selector 211c.

The subtracter 211a subtracts the lower four bits of the REMAIN_R_A_201 from a constant "10H" that corresponds to the size of one page. The result of this subtraction indicates the number of bytes that exist from the REMAI_R_A_201 to the next page boundary. FIG. 6 shows the four possible subtraction results that can be obtained corresponding to the lower four bits of the REMAIN_R_A_201.

The comparator 211b compares the number of bytes calculated by the subtracter 211a (represented by "A" in FIG. 5) with the number of bytes given by the REMAIN_R_SIZE_202 (represented by "B" in the figure).

If the REMAIN_R_SIZE_202 "B" is larger than the subtraction result "A", the selector 211c selects the subtraction result "A". If not (i.e., when unread data does not reach the next page boundary), the selector 211c selects the REMAIN_R_SIZE_202 "B". The selector 211c then outputs either the selected subtraction result "A" or REMAIN_R_SIZE_202 "B" to the size register 213 as the PARTIAL_R_SIZE_213 representing the size of the next read area.

In this way, the area detecting unit 211 determines the size of each read area. On the other hand, the start address of the detected read area represented by the PARTIAL_R_A_212 is equal to the REMAIN_R_A_201 in the address counter 201. The read specifying unit 210 sets the REMAIN_R_A_201 as the PARTIAL_R_A_212 in the address register 212 at the same time the size register 213 receives the output from the selector 211c.

Construction of Area Detecting Unit 311

Figure 7:
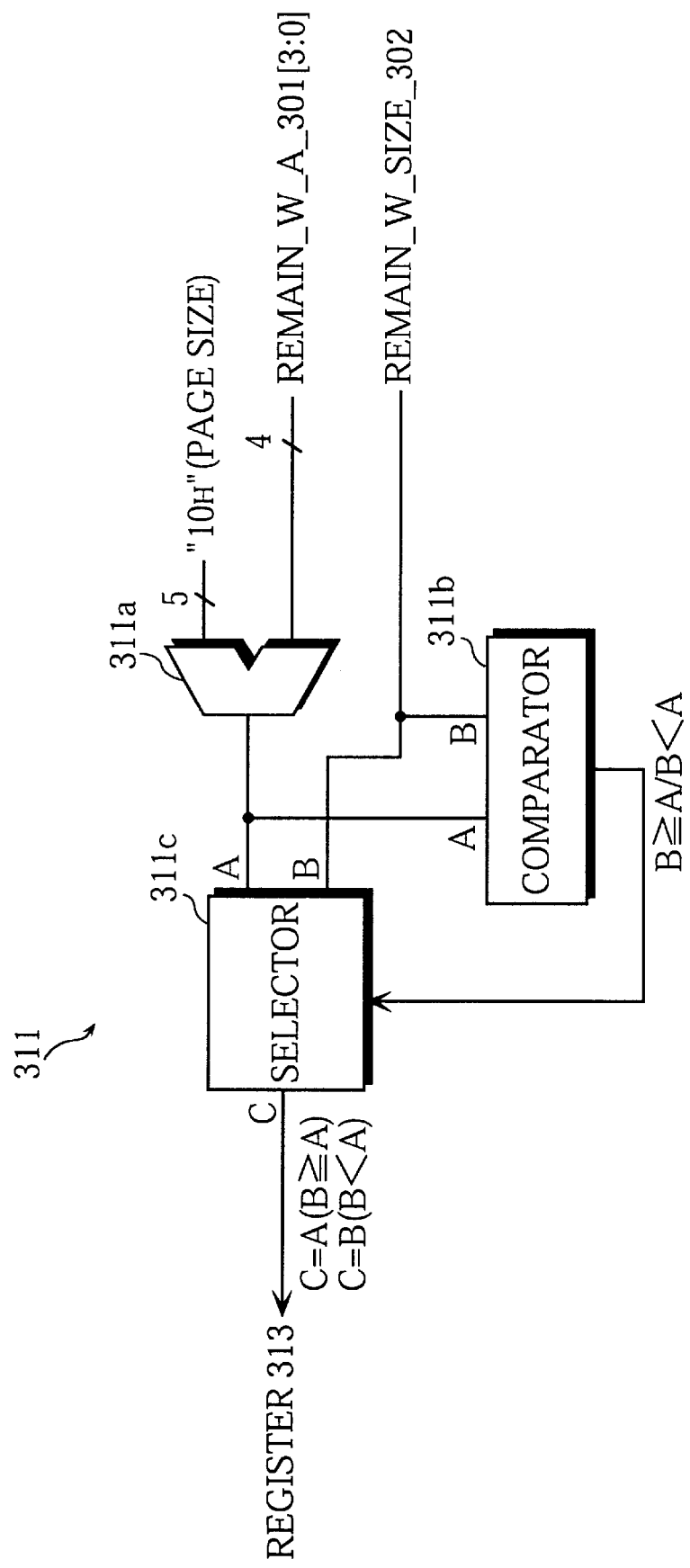
FIG. 7 is a block diagram showing an example of the detailed construction of an area detecting unit in the DMA transfer device 1.

The area detecting unit 311 has the construction shown in FIG. 7 and detects write areas one at a time using the subtraction results in FIG. 8. FIGS. 7 and 8 show similar constructions to the area detecting unit 211 of FIGS. 5 and 6 and so will not be described.

Processing of DMA Transfer Device 1

The following describes the processing of the DMA transfer device 1 of the first embodiment.

Figure 9:
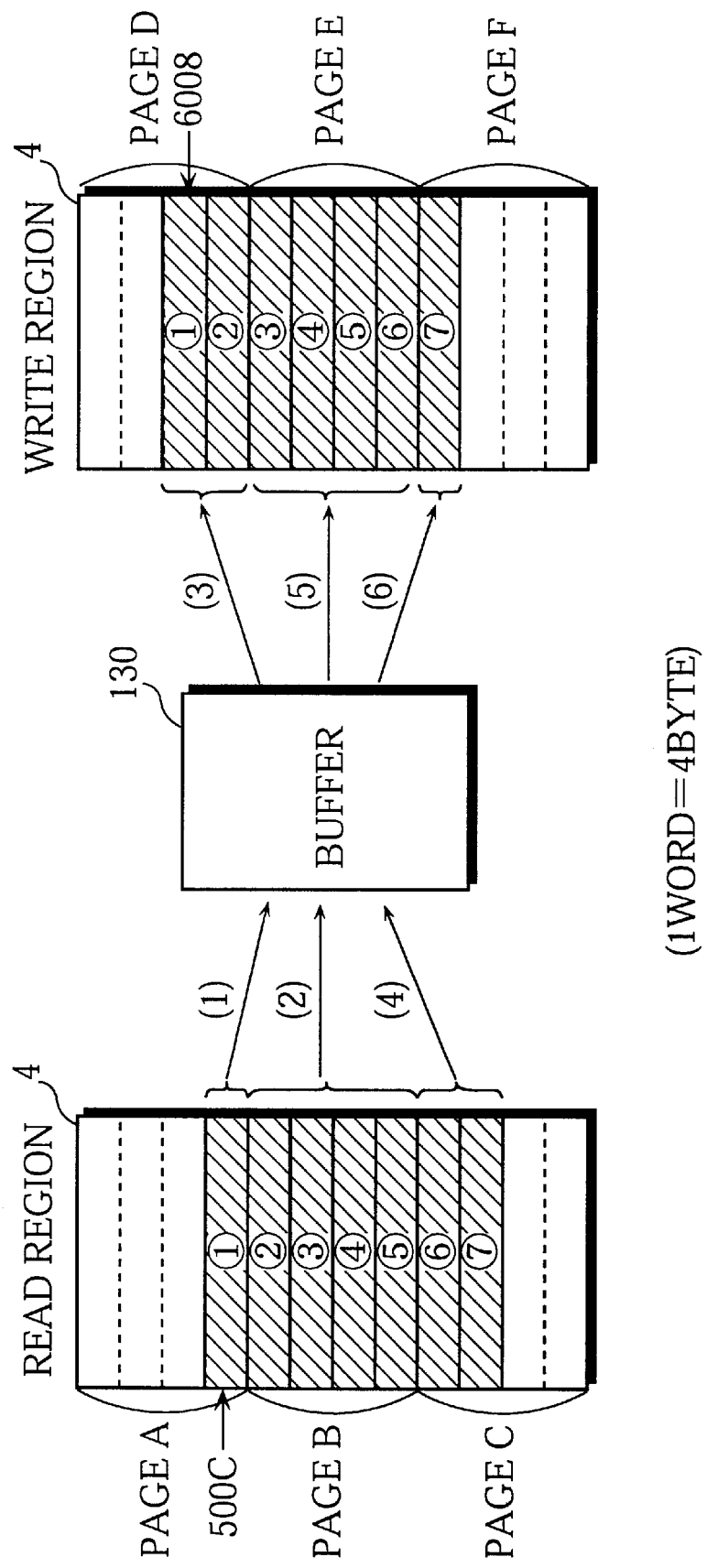
FIG. 9 is a explanation drawing showing DMA transfer from the read region to the write region shown in FIGS. 3 and 4.

FIG. 9 shows how DMA transfer is performed from the read region shown in FIG. 3 to the write region in FIG. 4. For this DMA transfer, the CPU 2 sets a DMA transfer request in the mode setting unit 100 by setting in registers 101–105 the following parameters: the TRANSFER_SIZE_101=28 (decimal) bytes in the register 101; the SRC_A_102=500C (hexadecimal) in the register 102; the DST_A_103=6008 (hex) in the register 103; the addressing mode, indicating for both read and write regions that DMA transfer is to be performed in ascending order of addresses, in the register 104; and four (decimal) bytes in the register 105 as the access data size.

After the CPU 2 sets the DMA transfer request in the mode setting unit 100 in this way, the DMA transfer device 1 reads data from read areas as shown by (1), (2), and (4) in FIG. 9 into the buffer 130, and writes read data from the buffer 130 into write areas as shown by (3), (5), and (6) in ascending order.

Figure 10:
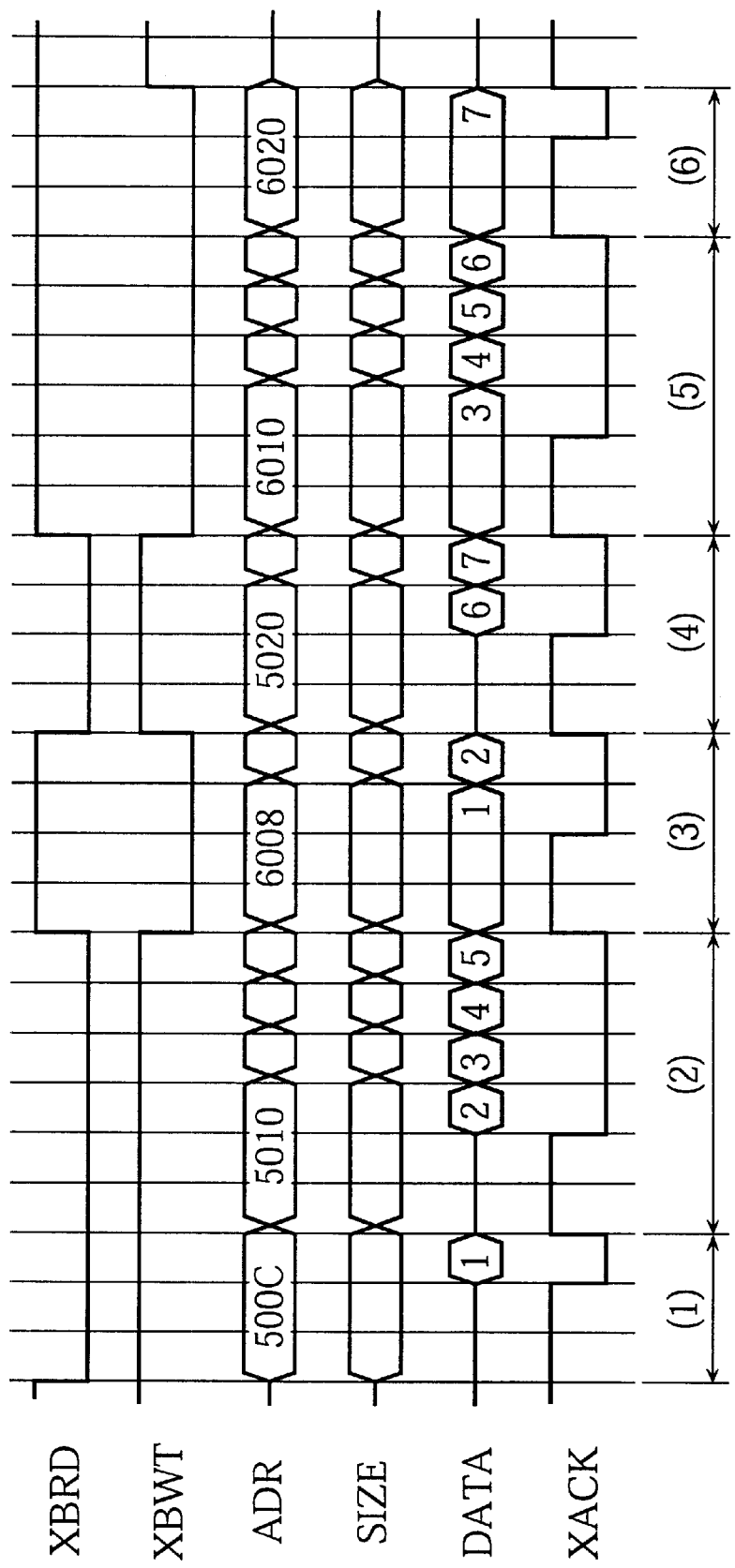
FIG. 10 is a timing chart showing the timing for DMA transfer shown in FIG. 9.

FIG. 10 is a timing chart showing for the DMA transfer in FIG. 9. The chart shows signals, addresses, and data that are transferred between the DMA transfer device 1 and the SDRAM interface 3. The signals include a read signal (shown by "XBRD") using negative logic, a write signal ("XBWT") using negative logic, and an acknowledgment signal ("XACK"). "ADR" represents an address of each area, and "SIZE" is an indication of the access data size (four bytes for the present embodiment). "DATA" represents the read/write data being transferred. The following describes the processing corresponding to this timing chart.

1. After the DMA request is set in the mode setting unit 100, the read management unit 200 stores the REMAIN_R_A_201 =500C (hex) and the REMAIN_R_SIZE_202=28 (decimal) as initial values, while the write management unit 300 stores the REMAIN_W_A_301=6008 (hex) and the REMAIN_W_SIZE_302=28 (decimal) as initial values.

Based on the REMAIN_R_A_201=500C and the REMAIN_R_SIZE_202=28 in the read management unit 200, and the access mode and the access data size in the mode setting unit 100, the read specifying unit 210 detects a read area at the start of the read region and obtains the size of the detected read area. Here, the read specifying unit 210 detects a read area storing the word ①, and sets the PARTIAL_R_A_212=500C (hex) and the PARTIAL_R_SIZE_213=4 (decimal) in the address register 212 and the size register 213.

In parallel with the processing by the read specifying unit 210, the write specifying unit 310 detects a write area shown as storing the words ①–② as the first write area, obtains the size of the detected write area, and sets the PARTIAL_W_A_312=6008 (hex) and the PARTIAL_W_SIZE_313=8 (decimal) in the address register 312 and the size register 313.

After the addresses and sizes of the read and write areas have been set, the access judging unit 110 judges whether the access control unit 120 should perform either a read or a write. Since the buffer management unit 111 calculates the size of the data currently in the buffer 130 as zero, the access judging unit 110 judges that a read should be performed from the detected read area and instructs the access control unit 120 to perform this read.

On receiving the instruction, the access control unit 120 reads the word ① from the detected read area and writes the read word ① into the buffer 130 as shown by (1) in FIGS. 9 and 10.

2. The access control unit 120 notifies the read specifying unit 210 of the end of the read, and then the read specifying unit 210 notifies the read management unit 200 of the PARTIAL_R_SIZE_213 as the size of the read area from which the read has been completed.

On receiving the notification, the read management unit 200 updates the address counter 201 and the data counter 202, by setting the REMAIN_R_A_201=5010 and the REMAIN_R_SIZE_202=24 bytes. On the other hand, the write specifying unit 301 does not update the address register 312 and the size register 313 since it has received no notification from the access control unit 102 indicating the end of a write. The address register 312 and the size register 313 remain unchanged and so store the PARTIAL_W_A_312=6008 and the PARTIAL_W_SIZE_313=8.

Since only one word of data is present in the buffer 130, the access judging unit 110 has the access control unit 120 perform another read.

On receiving the instruction, the access control unit 120 reads the words ②–⑤ from the detected read area and writes them into the buffer 130 as shown by (2) in FIGS. 9 and 10. This is achieved by a high-speed page access.

3. After this, the read management unit 200 receives the PARTIAL_R_SIZE_213 from the read specifying unit 210, and updates the address counter 201 and the data counter 202 by setting the REMAIN_R_A_201=5020 (hex) and the REMAIN_R_SIZE_202=8 (decimal) bytes, while the read specifying unit 210 updates the address register 212 and the size register 213 by setting the PARTIAL_R_A_212=5020 (hex) and the PARTIAL_R_SIZE_213=8.

Since five words are stored in the buffer 130, the access judging unit 110 judges that the access control unit 120 should perform a write into the write area that the write specifying unit 310 has detected at the start of the write region, and instructs the access control unit 120 to perform this write.

On receiving the instruction, the access control unit 120 writes the words ①–② from the buffer 130 into the write area as shown by (3) in FIGS. 9 and 10. This is achieved by a high-speed page access.

After this, the DMA control device 1 performs the read shown by (4) in FIGS. 9 and 10 and the writes shown by (5) and (6).

In this way, the DMA transfer device 1 performs high-speed page access for the reads (2) and (4), and the writes (3) and (5). This means that the DMA transfer device 1 performs high-speed page accesses for all the read and write areas except the first and last read and write areas in each region. However, high-speed page access will be also performed for the first and last areas if such areas store two or more words. The use of high-speed page accesses enables the entire DMA transfer to be completed quickly, using a buffer 130 whose capacity only needs to be equal to two pages (two pages minus one word to be exact).

Note that the present embodiment describes a case in which both the read region and the write region exist in the SDRAM 4, although if only one of the read region and write region is in the SDRAM 4, only the region in the SDRAM 4 needs to be accessed in units of read/write areas.

Second Embodiment

The DMA transfer system of the present embodiment includes a plurality of DMA channels of different priorities that share the buffer 130, and usually accesses a read/write region in units of read/write areas as described in the first embodiment. If the CPU 2 issues a DMA transfer request for a DMA channel of a higher priority than the DMA channel on which a DMA transfer is currently being performed, the DMA transfer system of the present embodiment suspends the current DMA transfer, performs the higher-priority DMA transfer, and then resumes the suspended DMA transfer. When suspending the current DMA transfer, the DMA transfer system empties the buffer 130 by writing data remaining in the buffer 130 into the write region in order, without accessing the write region in units of write areas.

Figure 11:
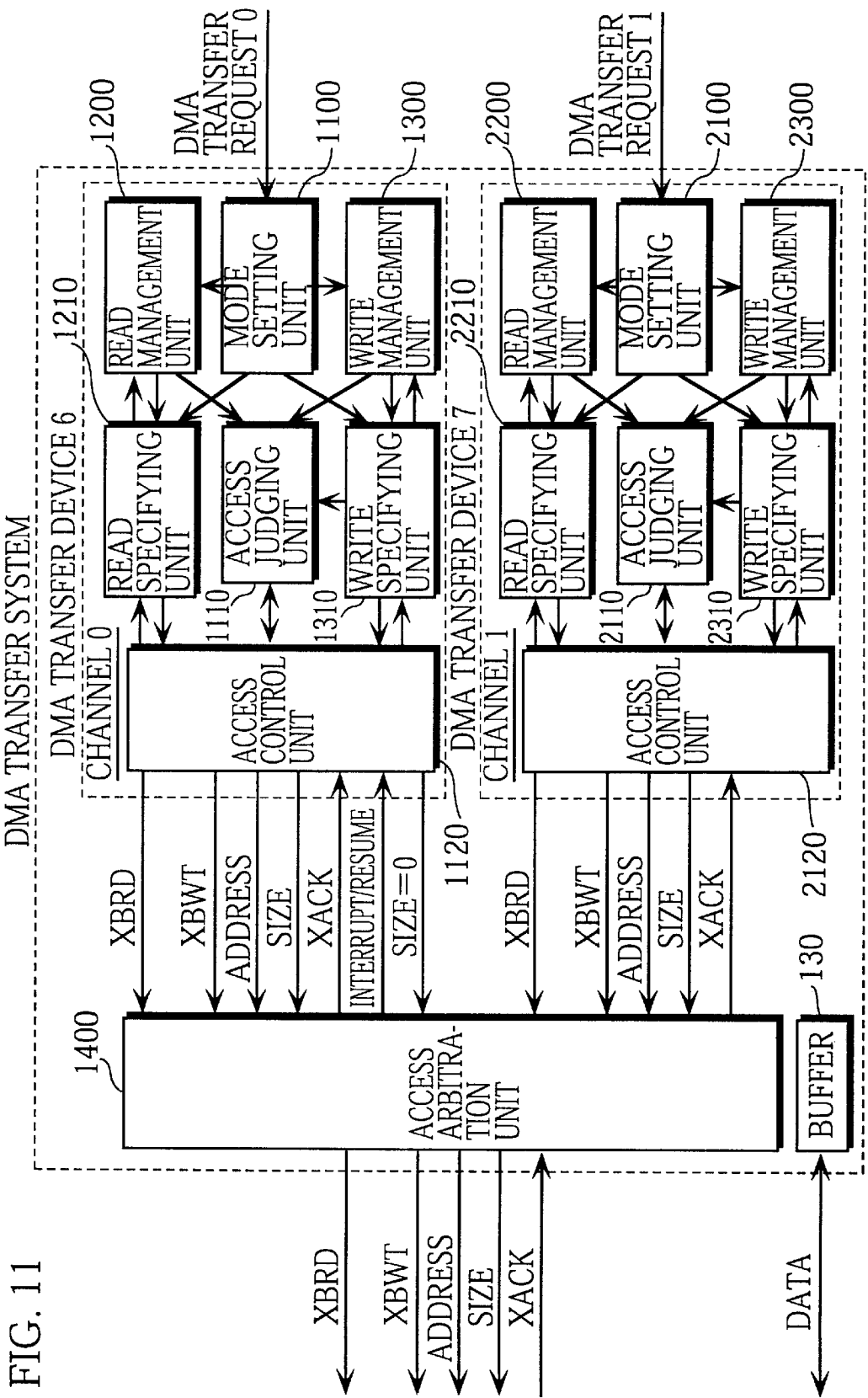
FIG. 11 is a block diagram showing the construction of a DMA transfer system of the second embodiment.

FIG. 11 is a block diagram showing the construction of the DMA transfer system of the second embodiment. This DMA transfer system includes two DMA transfer devices 6–7 that correspond to DMA channels 0–1, the buffer 130, and an access request arbitration unit 1400. The channel 1 has a higher priority than the DMA channel 0.

The access request arbitration unit 1400 receives an access request for the DMA channel 1 and an access request for the DMA channel 0 from the DMA transfer devices 6 and 7, respectively. When the two DMA transfers are in conflict, the access request arbitration unit 1400 arbitrates the two DMA transfers. Here, an access request refers to a read/write request for read/write areas defined in the first embodiment or for a read/write region containing page boundaries.

In more detail, the access request arbitration unit 1400 judges whether a DMA transfer request that has not been completed is set in the DMA transfer devices 6 and 7, respectively. The access request arbitration unit 1400 can make this judgement by checking, for instance, whether write management units 1300 and 2300 (that are basically the same as the write management unit 200 of the first embodiment) in the DMA transfer devices 6 and 7 respectively store REMAIN_W_SIZE_1302=0 and REMAIN_W_SIZE_2302=0, meaning the size of data that is yet to be written into a write region is zero.

On judging that an uncompleted DMA transfer request is set in only one of the DMA transfer devices 6 and 7, the access request arbitration unit 1400 accepts an access request corresponding to the uncompleted DMA transfer request, and outputs the access request to the SDRAM interface 3.

On the other hand, on judging that uncompleted DMA transfer requests are set in both the DMA transfer devices 6 and 7, the access request arbitration unit 1400 performs the following processing.

If a DMA transfer request for the DMA channel 0 of the lower priority is set during a DMA transfer for the DMA channel 1, the access request arbitration unit 1400 only accepts the access request for the DMA channel 0 after the DMA transfer for the DMA channel 1 has been completed and outputs the access request to the SDRAM interface 3.

If a DMA transfer request for the DMA channel 1 of the higher priority is set during a DMA transfer for the DMA channel 0, the access request arbitration unit 1400 outputs a suspend instruction to the DMA transfer device 6 to suspend the current DMA transfer. On receiving a notification indicating that the DMA transfer device 6 has emptied the buffer 130 from the DMA transfer device 6, the access request arbitration unit 1400 accepts the access request for the channel 1 from the DMA transfer device 7 and outputs it to the SDRAM interface 3. When the DMA transfer for the DMA channel 1 has been completed, the access request arbitration unit 1400 outputs a DMA resume instruction to the DMA transfer device 6.

The DMA transfer device 6 contains the following functional units: a mode setting unit 1100; an access judging unit 1110; an access control unit 1120; a read management unit 1200; a read specifying unit 1210; a write management unit 1300; and a write specifying unit 1310.

Among the above functional units, the mode setting unit 1100, a read management unit 1200, a read specifying unit 1210, and a write management unit 1300 are the same as those shown in FIG. 2, and so will not be described. The following explanation focuses on functional units unique to the present embodiment.

Figure 12:
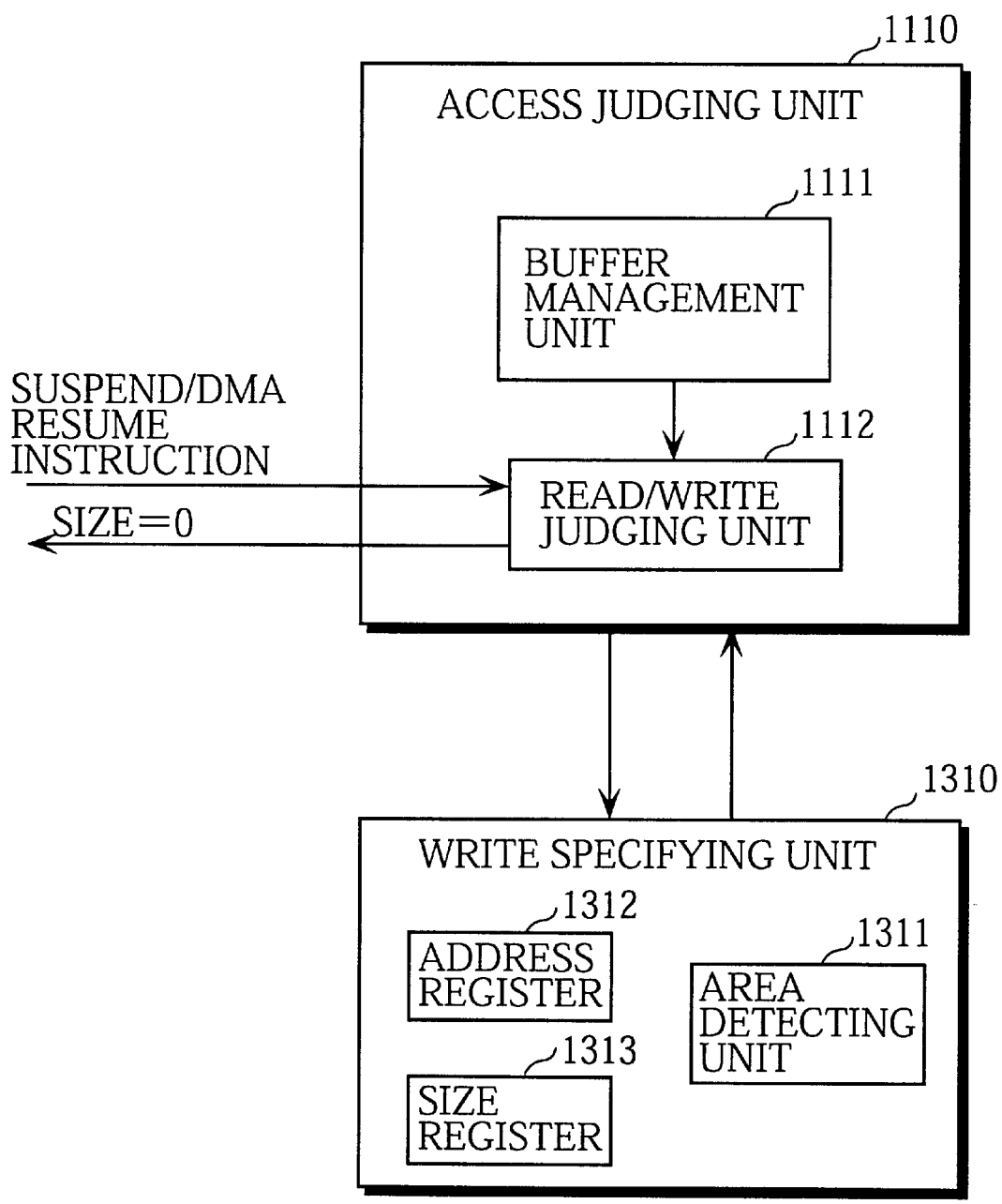
FIG. 12 is a block diagram showing the detailed construction of an access judging unit in the DMA transfer system.

In addition to the functions of the access judging unit 110 in FIG. 2, the access judging unit 1110 has functions to receive the suspend instruction and the DMA resume instruction from the access request arbitration unit 1400 via the access control unit 1120 to suspend a currently performed DMA transfer or resume a DMA transfer that has been suspended. FIG. 12 shows the construction of the access judging unit 1110 that contains a buffer management unit 1111 and a read/write judging unit 1112.

The buffer management unit 1111 calculates the size of data currently in the buffer 130 in the same way as the buffer management unit 111 in FIG. 2.

The read/write judging unit 1112 has the following functions in addition to the functions of the read/write unit 112 in FIG. 2.

Once receiving the suspend instruction from the access control unit 1120 during DMA transfer, the read/write judging unit 1112 suspends judging that the access control unit 1120 should perform a read. The read/write judging unit 1112 temporarily prohibits the processing of the area detecting unit 1311 in the write specifying unit 1310 and sets the data size that has been calculated by the buffer management unit 1111 in the size register 1313. After all the remaining data has been read from the buffer 130 and the buffer management unit 1111 calculates the data size as "0", the read/write judging unit 1112 sends a notification indicating that the buffer 130 is empty to the access request arbitration unit 1400 via the access control unit 1120.

On receiving the DMA resume instruction from the access request arbitration unit 1400 via the access control unit 1120, the read/write unit 1112 stops prohibiting the processing of the area detecting unit 1311 and detects each area in the same way as the read/write judging unit 112 in FIG. 2.

The write specifying unit 1310 contains an area detecting unit 1311, an address register 1312, and a size register 1313 as shown in FIG. 12.

The address register 1312 and the size register 1313 are basically the same as the address register 312 and the size register 313 in FIG. 2. However, when the read/write judgement unit 1112 receives the suspend instruction, the size register 1313 stores a data size that is directly set by the read/write judging unit 1112. This data size is the size of data in the buffer 130.

The area detecting unit 1311 is basically the same as the area detecting unit 311 in FIG. 2 except that the processing of the area detecting unit 1311 is temporarily prohibited by the read/write specifying unit 1112.

Aside from the functions of the access control unit 120 in FIG. 2, the access control unit 1120 receives the suspend instruction and the DMA resume instruction from the access request arbitration unit 1400 and outputs them to the access judging unit 1110. The access control unit 1120 also receives the notification indicating that the buffer 130 is empty from the access judging unit 1110 and outputs it to the access request arbitration unit 1400.

The DMA transfer device 7 contains the following functional units: a mode setting unit 2100; an access judging unit 2110; an access control unit 2120; a read management unit 2200; a read specifying unit 2210; a write management unit 2300; and a write specifying unit 2310. These functional units are the same as those of the DMA transfer device 1 in FIG. 2 and so will not be explained.

Processing of DMA Transfer System

Figure 13:
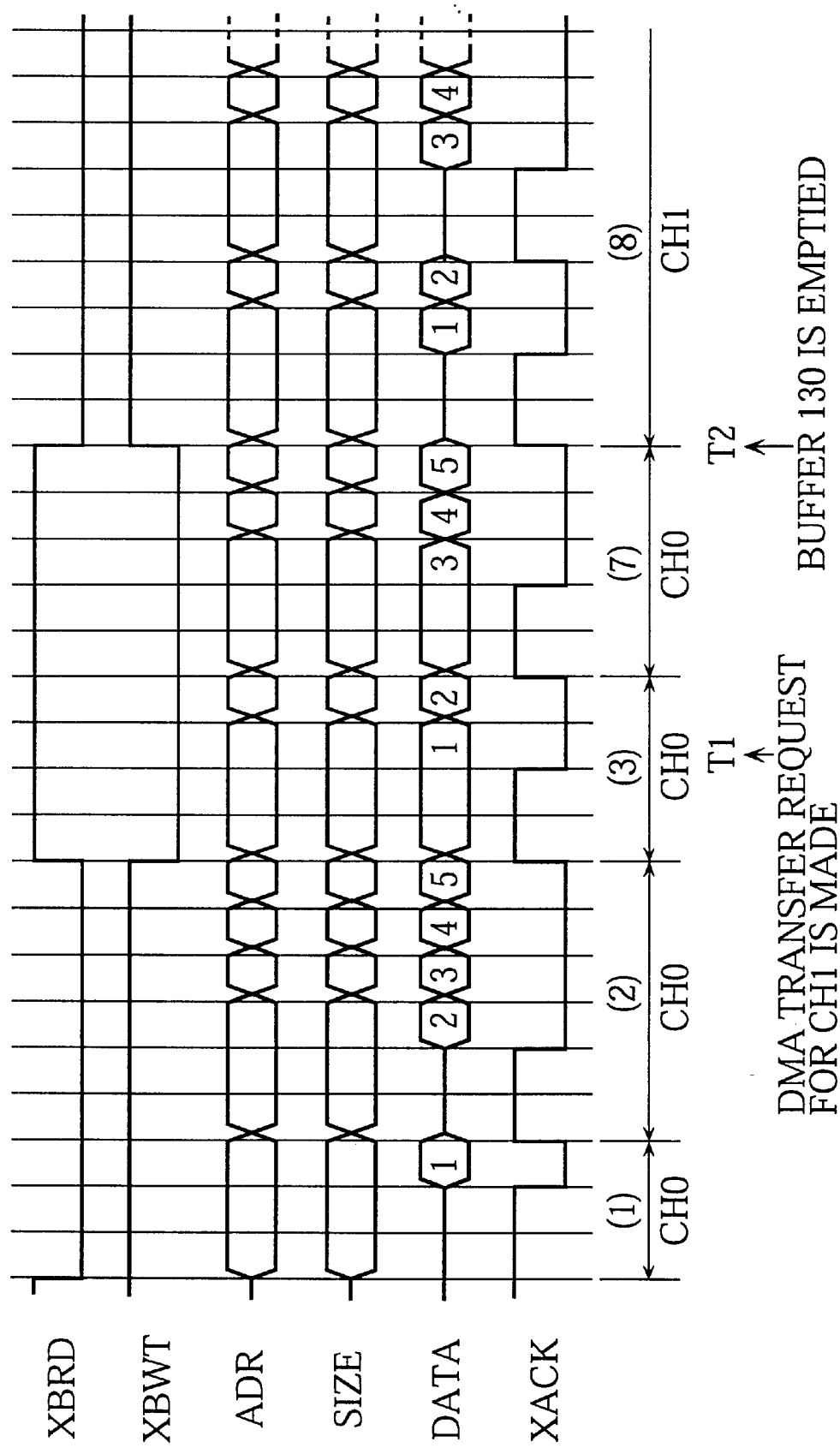
FIG. 13 is a timing chart for DMA transfer performed by the DMA transfer system.

FIG. 13 is a timing chart for DMA transfer by the present DMA transfer system. In this chart, the DMA transfer device 6 for the channel 0 is set a DMA transfer request of a DMA transfer that is basically the same as the DMA transfer corresponding to FIGS. 3, 4, and 10, while the DMA transfer device 7 for the channel 1 is set another DMA transfer request with the timing represented by "T1".

In the same way as FIG. 10, (1) and (2) in this chart show timing for reads from read areas for the channel 0, and (3) shows timing for a write into a write area.

If the CPU 2 sets a DMA transfer request for the DMA channel 1 of the higher priority in the mode setting unit 2100 during the write (3), the access request arbitration unit 1400 judges that uncompleted DMA transfer requests are set in both the DMA transfer devices 6 and 7. The access request arbitration unit 1400 then outputs the suspend instruction to the DMA transfer device 6. On receiving the suspend instruction, the read/write judging unit 1112 in the DMA transfer device 6 judges that reads should no longer be performed. When the write with the timing shown by (3) has been completed, the read/write judging unit 1112 notifies the write specifying unit 1310 of the size of data in the buffer 130. The write specifying unit 1310 then sets the notified data size in the size register 1313. As a result, the access control unit 1120 writes all the data for the DMA channel 0 that remains in the buffer 130 into a write area with the timing indicated by (7).

After the remaining data has been written into the write area, the read/write judging unit 1112 sends a notification indicating that the buffer 130 is empty to the access request arbitration unit 1400 via the access control unit 1120. On receiving this notification, the access request arbitration unit 1400 accepts an access request for the DMA channel 1 from the DMA transfer device 7 and outputs the access request to the SDRAM interface 3. Following this, a DMA transfer for the DMA channel 1 is performed with the timing shown by (8).

After this, on judging that the DAM transfer of the DMA transfer device 7 for the DMA channel 1 has been completed, the access request arbitration unit 1400 outputs the DMA resume instruction to the DMA transfer device 6.

In this way, the DMA transfer system of the present embodiment temporarily stops a current DMA transfer to perform a DMA transfer of a higher priority. Accordingly, the present DMA transfer system does not need an independent buffer for each DMA channel, and still can perform DMA transfer for different channels with a reduced circuit size.

Third Embodiment

Figure 14:
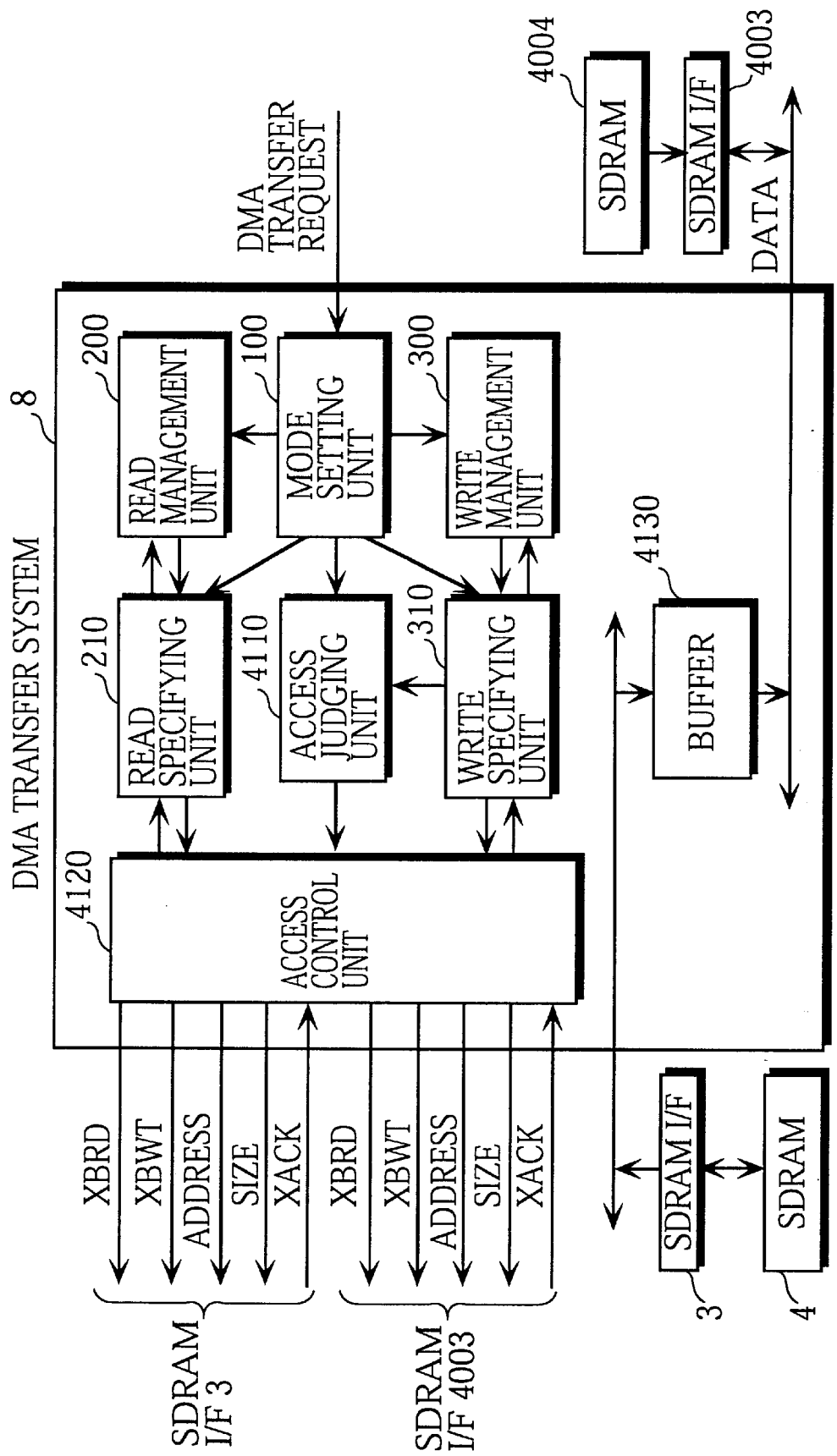
FIG. 14 is a block diagram showing the construction of a DMA transfer device 8 of the third embodiment.

FIG. 14 shows the construction of a DMA transfer device 8 of the third embodiment. This DMA transfer device 8 has basically the same construction as the DMA transfer device of the first embodiment shown in FIG. 2, although the access judging unit 110, the access control unit 120, and the buffer 130 of the DMA transfer device 1 are respectively replaced with an access judging unit 4110, an access control unit 4120, and a buffer 4130 in the present DMA transfer device 8. Other functional units are common to the DMA transfer devices 1 and 8 and so are given the same reference numbers. The following does not the describe these common functional units and instead focuses on the differences between the DMA transfer devices 1 and 8.

The buffer 4130 is a two-port memory capable of parallel reads and writes. One port is connected to the SDRAM 4 via the SDRAM interface 3, and the other to the SDRAM 4004 via the SDRAM interface 4003. Reads and writes are possible via either of the buffer's two ports, and a write via one port can be performed in parallel with a read via the other port.

The access judging unit 4110 directly obtains a number of bytes representing the amount of data in the buffer 4130 from the buffer 4130 and manages this amount. Accordingly, the access judging unit 4110 obtains and updates the amount each time one word is read from or written into the buffer 4130. When the free space in the buffer 4130 is at least as large as the next read area (the PARTIAL_R_SIZE_213) set by the read specifying unit 210, the access judging unit 4110 judges that the access control unit 4120 should perform a read next. When the amount of data in the buffer 4130 is at least as large as the next write area (the PARTIAL_W_SIZE_313) set by the write specifying unit 310, the access judging unit 4110 judges that the access control unit 4120 should perform a write. In this way, the access judging unit 4110 makes the above judgements for a read and a write separately, and so can make a judgement for a write sooner than the access judging unit 110 for the first embodiment.

The access control unit 4120 performs a read from a read area specified by the read specifying unit 210 and a write into a write area specified by the write specifying unit 310 for the SDRAM 4 and the SDRAM 4004 in parallel.

Processing of DMA Transfer Device 8

Figure 15:
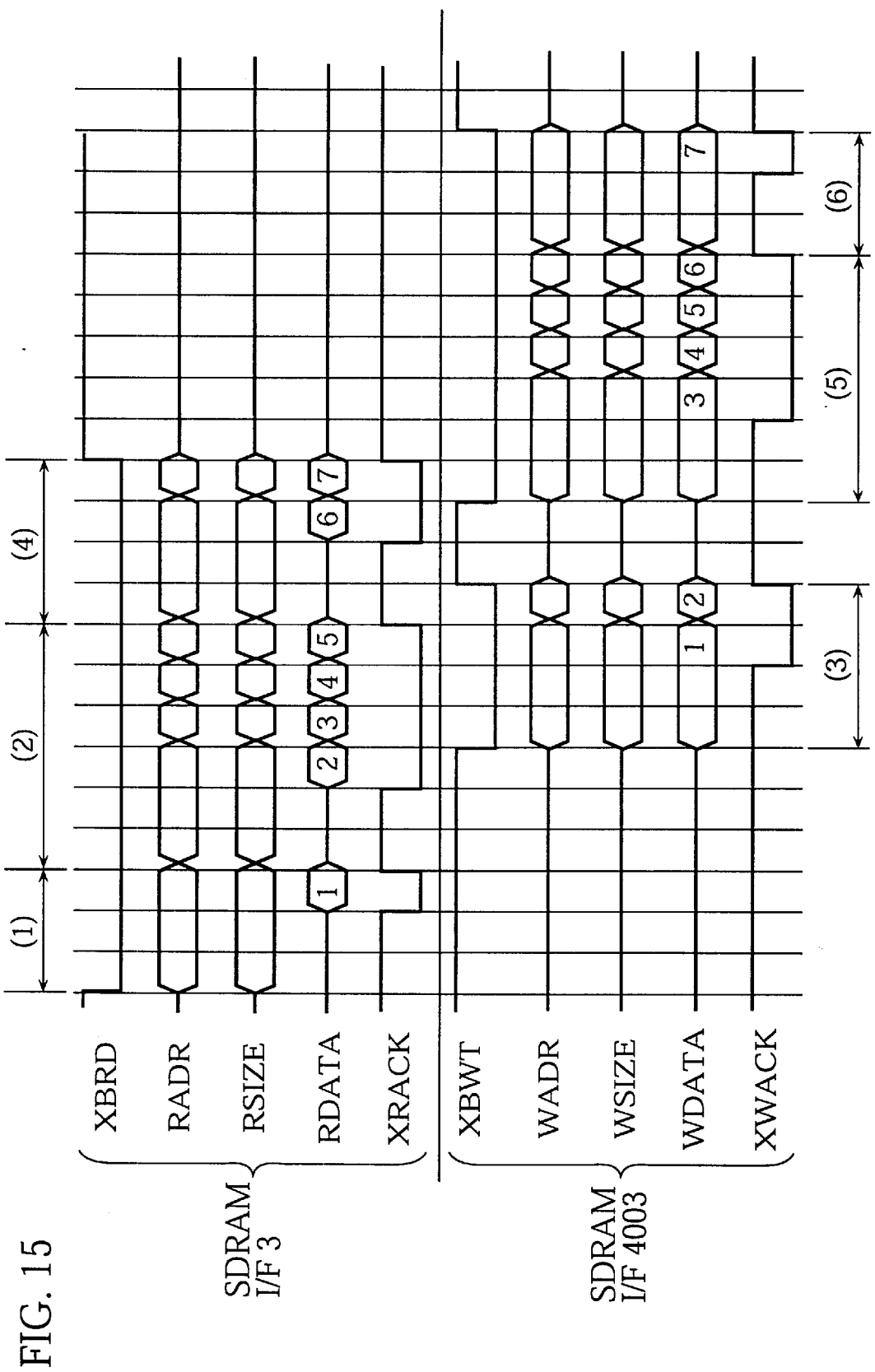
FIG. 15 is a timing chart for DMA transfer by the DMA transfer device 8.

FIG. 15 is a chart showing the timing of DMA transfer by the DMA transfer device 8.

The upper half of the chart shows signals transferred between the access control unit 4120 and the SDRAM interface 3 and write/read data, and the lower half shows signals transferred between the access control unit 4120 and the SDRAM interface 4003 and write/read data. A read region for this DMA transfer is seven words in size and has the start address "5008", while the write region is seven words in size and has the start address "600C".

As can be seen by comparing FIG. 15 with FIG. 10, the writes (3), (5), and (6) are performed earlier in FIG. 15 than in FIG. 10. This is achieved by the access judging unit 4110 managing the amount of data in the buffer 4130 in units of words so that it can judge that a write into the next write area should be performed as soon as an amount of data equal to the size of the next write area has been accumulated in the buffer 4130.

In addition to performing the high-speed page access to write/read areas, the DMA transfer device 8 of the present embodiment can simultaneously execute a read from one memory and a write into another memory connected to a different bus.

Fourth Embodiment

While the DMA transfer system of the second embodiment has two DMA channels 0 and 1 for DMA transfer to/from the same SDRAM 4 or different memories connected to the same bus, the DMA transfer system of the present embodiment has two DMA channels for DMA transfer between different memories connected to different buses as well as for DMA transfer described in the second embodiment.

Figure 16:
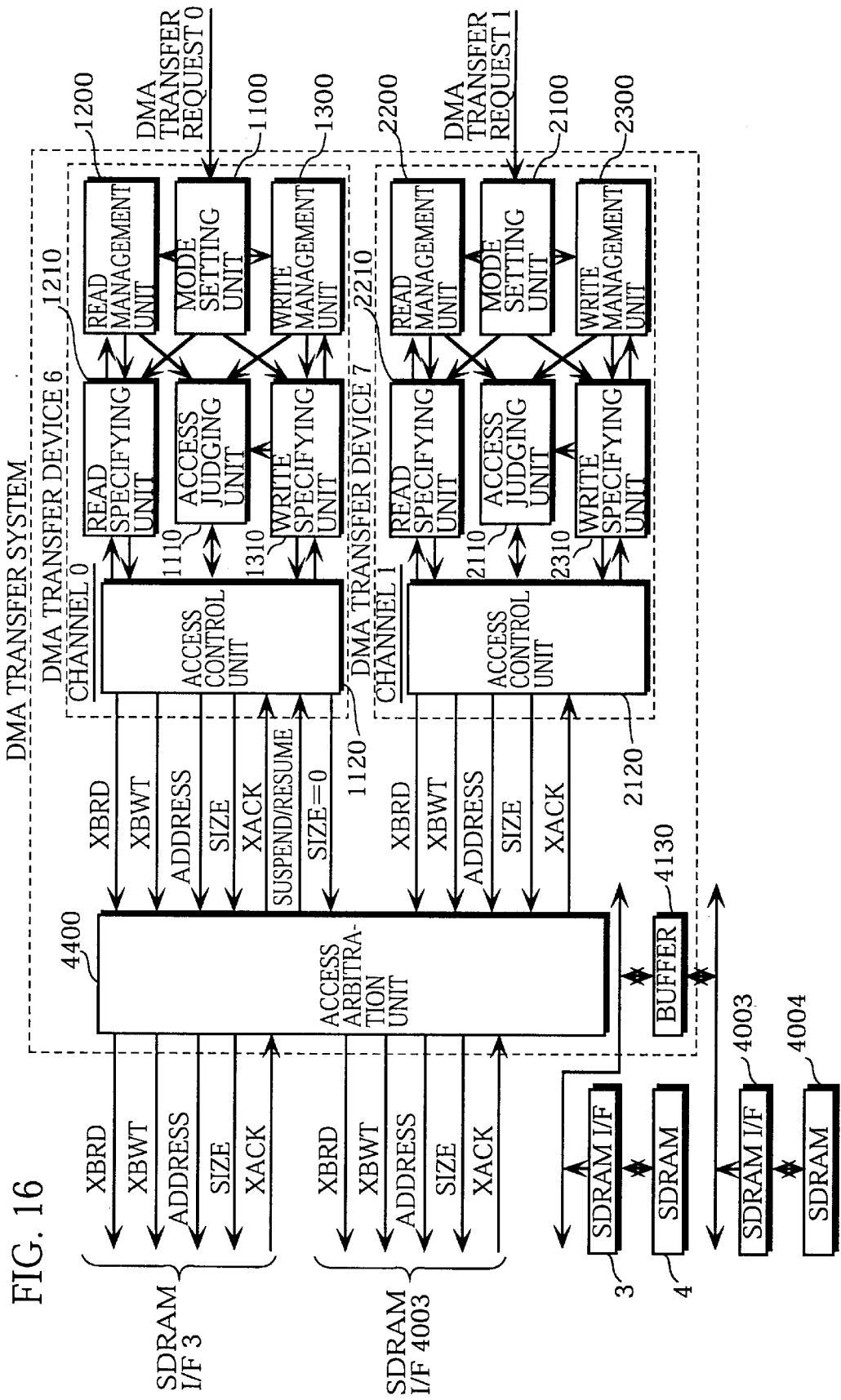
FIG. 16 is a block diagram showing the construction of a DMA transfer system of the fourth embodiment.

FIG. 16 is a block diagram showing the construction of the DMA transfer system of the present embodiment. The DMA transfer system of the present embodiment differs from that of the second embodiment shown in FIG. 11 in that it includes an access request arbitration unit 4400 instead of the access request arbitration unit 1400 of the second embodiment and a buffer 4130 instead of the buffer 130. Functional units in FIG. 16 assigned the same reference numbers as those in FIG. 11 perform the same functions as described in the second embodiment and so will not be described. The following description focuses on the processing unique to the present embodiment.

The buffer 4130 is a two-port memory capable of parallel reads and writes. One port is connected to the SDRAM 4 via the SDRAM interface 3, and the other to the SDRAM 4004 via the SDRAM interface 4003. Reads and writes are possible via either of the two ports.

Figure 17:
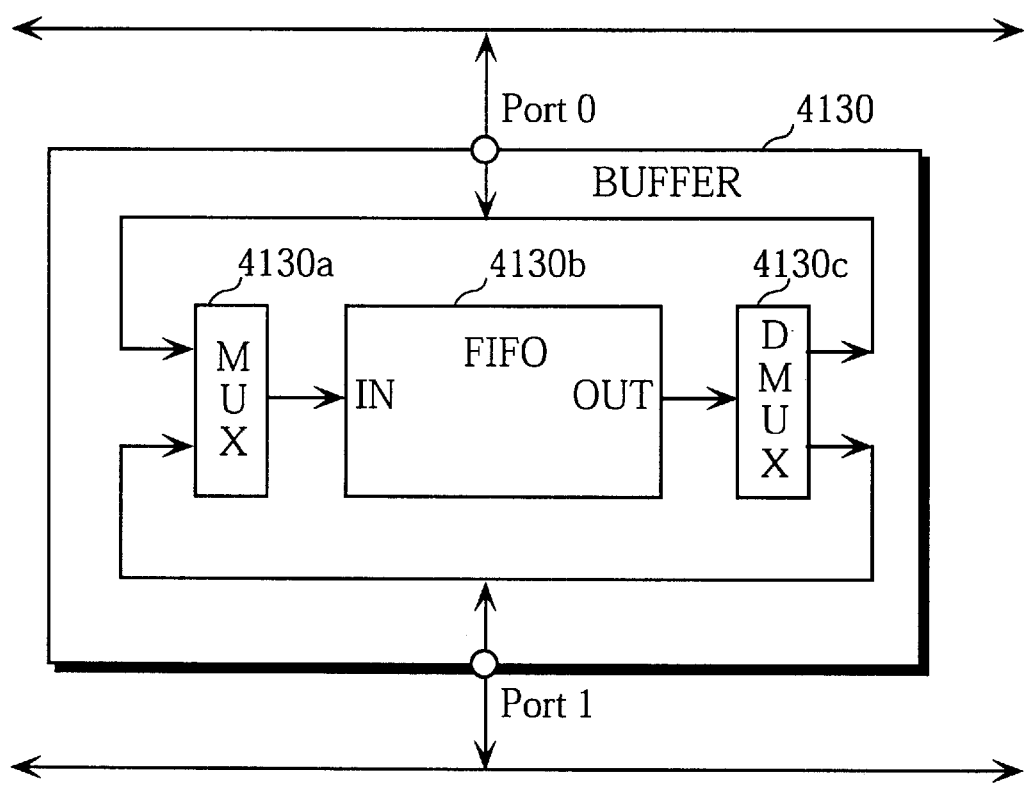
FIG. 17 shows a construction example of a two-port buffer in the DMA transfer system.

FIG. 17 shows the construction of the buffer 4130 that includes a multiplexer 4130a, a first-in first-out (FIFO) memory 4130b, and a demultiplexer 4130c. The two ports 0 and 1 are connected to the multiplexer 4130a and the demultiplexer 4130c, which allows the buffer 4130 to perform a read via one of the ports 0 and 1 and a write via the other port in parallel.

If the CPU 2 sets a DMA transfer request for the DMA channel 1 of the higher priority in the DMA transfer device 7 during a DMA transfer for the DMA channel 0 and both a write region for the DMA channel 0 and a read region for the DMA channel 1 exist in the same SDRAM (or in different SDRAMs connected to the same bus, whose state is not shown in the figure), then the access request arbitration unit 4400 performs the same processing as the access arbitration unit 1400 of the second embodiment.

On the other hand, if the CPU 2 sets a DMA transfer request for one of the DMA channels 0 and 1 during a DMA transfer for the other DMA channel and a read region for the current DMA transfer and a write region for the requested DMA transfer exist in different SDRAMs 4 and 4004 connected to different buses, then the access request arbitration unit 4400 performs the following processing. After the access request arbitration unit 4400 has read all the data from a read region into the buffer 4130 for the current DMA transfer and when a space in the buffer 4130 having the same size as the first read area in the read region for the requested DMA transfer has become available, the access request arbitration unit 4400 starts a read from the first read area.

FIGS. 18A–18F show example states of DMA transfers in which a write region for the DMA channel 0 and a read region for the DMA channel 1 exist in different SDRAMs 4 and 4004, and a DMA transfer request for the DMA channel 1 has been requested during a DMA transfer for the DMA channel 0. In these figures, "SRC0" and "DST0" represent a read region and a write region for the channel 0, and "SRC1" and "DST1" represent read and write regions for the channel 1. A dotted line ① in each figure shows a read from the last read area for the channel 0 into the buffer 4130, and a solid line ② represents a write for the DMA channel 0 from the buffer 4130 into the last write area in one of the SDRAMs 4 and 4004. A solid line ③ represents a read for the DMA channel 1 from the first read area in one of the SDRAMs 4 and 4130 into the buffer 4130. The access arbitration unit 4400 performs a write ② into an SDRAM in parallel with a read ③ from the other SDRAM since these two SDRAMs 4 and 4004 are connected to different buses.

Processing of DMA Transfer System

Figure 18:
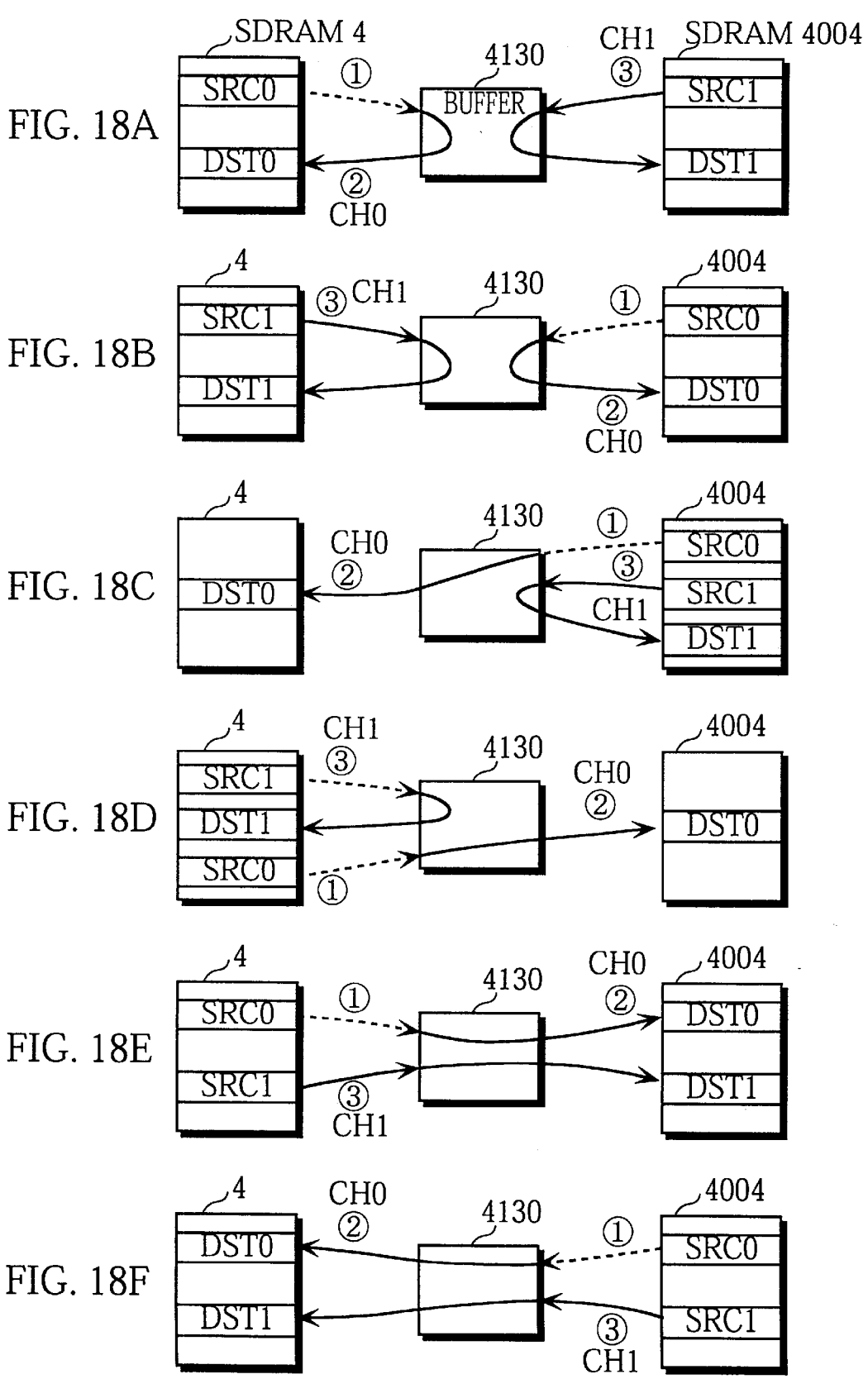
FIGS. 18A–18F are explanation drawings showing DMA transfer examples in which a write region for a DMA channel 0 and a read region for a DMA channel 1 area are located in different memories.
Figure 19:
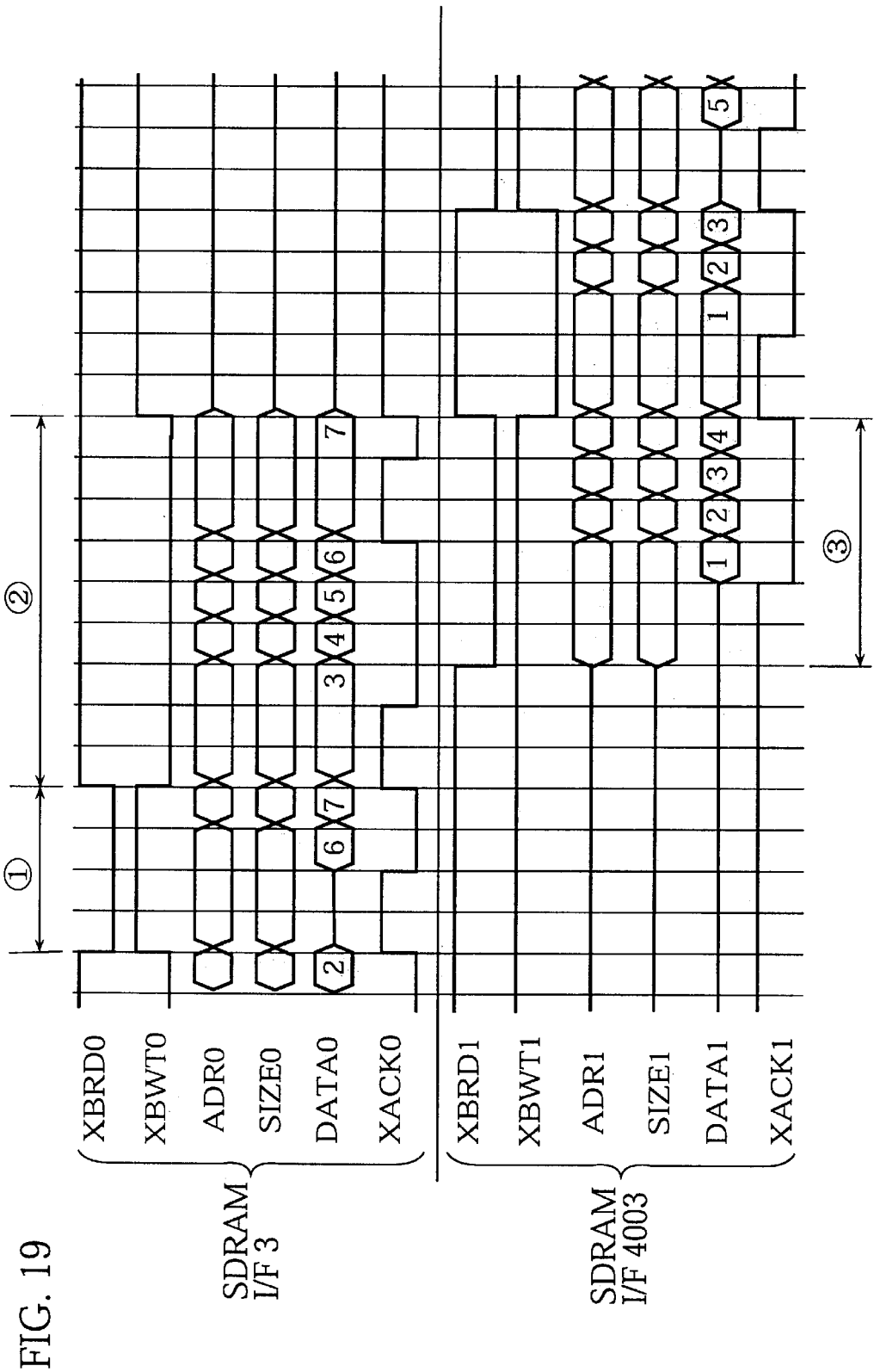
FIG. 19 is a timing chart for the DMA transfer shown in FIG. 18A.

FIG. 19 is a timing chart for the DMA transfer shown in FIG. 18A.

The upper half of the figure shows signals and addresses transferred between the access request arbitration unit 4400 and the SDRAM interface 3 and read/write data for the DMA channel 0, and the lower half shows signals and addresses transferred between the access request arbitration unit 4400 and the SDRAM interface 4003 and read/write data for the DMA channel 1. The numbers ① to ③ in the chart correspond to those in FIG. 18A.

If the CPU 2 sets a DMA transfer request for the DMA channel 1 during the other DMA transfer for the DMA channel 0 and a write region for the DMA channel 0 and a read region for the DMA channel 1 exists in different SDRAMs 4 and 4004, then the access request arbitration unit 4400 starts a read for the channel 1 from the first read area after it has read all the data from the read region for the channel 0 (after the read ① and a space having the same size as the first read area for the channel 1 becomes available in the buffer 4130 (at the start of the read ③)).

As has been described, if the CPU 2 sets a DMA transfer request for one DMA channel during another DMA transfer for the other DMA channel and a read region for the requested DMA transfer and a write region for the current DMA transfer exist in different memories connected to different buses, the present DMA transfer system starts a read from the first read area for the requested DMA transfer after it has read all the data from a read region for the current DMA transfer and a space having the same size as the first read area for the requested DMA transfer becomes available in the buffer 4130. This enables the buses to be efficiently used in response to the two DMA transfer requests that have been consecutively issued.

Note that although FIGS. 18A–18F shows examples of DMA transfers in which a DMA transfer request for the channel 1 is set during a DMA transfer for the DMA channel 0, the access request arbitration unit 4400 performs the same processing as described above even in the opposite cases of FIGS. 18A–18F, that is, when a DMA transfer request for the channel 0 is set during a DMA transfer for the DMA channel 1.

The DMA transfer system of the present embodiment may include three or more DMA transfer devices. In this case, the access request arbitration unit 4400 needs to detect ends of reads from the last read areas for each DMA transfer device as well as where the read and write regions exist, and control different DMA transfers in a manner similar to that shown in FIG. 19.

Supplementary Explanation

The above embodiments have been described with a premise that both read and write regions exist in a memory capable of high-speed page access. However, if only one of the read region and write region exists in such a memory, a DMA transfer device of the present invention only needs to perform the high-speed page access to that memory. This case includes DMA transfer between a memory allowing high-speed page access and an I/O device assigned one fixed address, for instance, in which case a small buffer 130/4130 can be used.

The subtracter 211*a* used in the first embodiment may be replaced with a logical circuit or a table that inputs lower four bits of the REMAIN_R_A_201 as shown in FIG. 6 and outputs the same values as subtraction results in the figure.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A DMA transfer device that transfers data from a first region to a second region in a memory allowing high-speed page access, the DMA transfer device comprising:
first detecting means for detecting a plurality of read areas that form the first region, each read area being demarcated by a page boundary and one of: (1) a start of the first region; (2) an end of the first region; and (3) another page boundary, including,
first address updating means for storing an access address whose initial value is a start address of the first region and for updating the access address, whenever the access means has read all data from one read area, to a start address of a remaining part of the first region;
first data size updating means for storing a remaining data size whose, initial value is a data size of the first region and for updating the remaining data size, whenever the access means has read all data from one read area, to a data size of the remaining part of the first region; and
read area detecting means for detecting a read area as an area from the access address to a next page boundary when the access address is set at the initial value and for otherwise detecting a read area as an area from the access address to either a next page boundary or the end of the first region to be accessed;
second detecting means for detecting a plurality of write areas that form the second region, each write area being demarcated by a page boundary and one of: (1) a start of the second region; (2) an end of the second region; and (3) another page boundary, including,
second address updating means for storing an access address whose initial value is a start address of the second region and for updating the access address, whenever the access means has written all data into one write area, to a start address of a remaining part of the second region;
second data size updating means for storing a remaining data size whose initial value is a data size of the second region and for updating the remaining data size, whenever the access means has written all data into one write area, to a data size of the remaining part of the second region; and
write area detecting means for detecting a write area as an area from the access address in the second address updating means to a next page boundary when the access address is set at the initial value and for otherwise detecting a write area as an area from the access address to either a next page boundary or the end of the second region, including, second size detecting means for detecting a size of an area from the access address in the second address updating means to either the next page boundary or the end of the second region and second size storing means for storing the detected area size as a size of the write area, wherein the access means performs high-speed page access to the area of the write area size in the second size storing means, starting from the access address in the second address updating means; and access means for performing high-speed page access to each of the read areas and each of the write areas.

2. The DMA transfer device of claim wherein the detecting means includes:

address updating means for storing an access address whose initial value is a start address of the region to be accessed and for updating the access address, whenever the access means has performed an access, to a start address of a remaining part of the region to be accessed;

remaining data size updating means for storing a remaining data size whose initial value is a data size of the region to be accessed and for updating the remaining data size, whenever the access means has performed an access, to a data size of the remaining part of the region to be accessed; and access area detecting means for detecting an access area as an area from the access address to a next page boundary when the access address is set at the initial value and for otherwise detecting an access area as an area from the access address to either a next page boundary or the end of the region to be accessed.

3. A DMA (Direct Memory Access) transfer device that accesses a region in a memory allowing high-speed page access, the DMA transfer device comprising detecting means for detecting access areas that form the region to be accessed, each access area being demarcated by a page boundary and one of: (1) a start of the region; (2) an end of the region; and (3) another page boundary and access means for performing high-speed page access to each access area, wherein the detecting means includes:

address updating means for storing an access address whose initial value is a start address of the region to be accessed and for updating the access address, whenever the access means has performed an access, to a start address of a remaining part of the region to be accessed;

remaining data size updating means for storing a remaining data size whose initial value is a data size of the region to be accessed and for updating the remaining data size, whenever the access means has performed an access, to a data size of the remaining part of the region to be accessed; and access area detecting means for detecting an access area as an area from the access address to a next page boundary when the access address is set at the initial value and for otherwise detecting an access area as an area from the access address to either a next page boundary or the end of the region to be accessed, and wherein the access area detecting means includes size detecting means for detecting a size of an area from the access address in the address updating means to either the next page boundary or the end of the region and size storing means for storing the detected area size as a size of the access area, wherein the access means performs high-speed page access to the area of the access area size in the size storing means, starting from the access address in the address updating means.

4. The DMA transfer device of claim 3, wherein the size detecting means includes:

subtracting means for subtracting a value, which is indicated by lower bits of the access address and shows a relative position of the access address within a page in the memory, from a page size of each page to produce a subtraction result;

comparing means for comparing the subtraction result with the remaining data size to produce a comparison result; and selecting means for selecting, based on the comparison result, one of the subtraction result and the remaining data size to give a smallest selection result, wherein the size storing means stores the selection result as the access area size.

5. A DMA transfer device that transfers data from a first region to a second region in a memory allowing high-speed access, the DMA transfer device comprising:

first detecting means for detecting a plurality of read areas that form the first region, each read area being demarcated by a page boundary and one of: (1) a start of the first region; (2) an end of the first region; and (3) another page boundary;

second detecting means for detecting a plurality of write areas that form the second region, each write area being demarcated by a page boundary and one of: (1) a start the second region; (2) an end of the second region; and (3) another page boundary; and access means for performing high-speed page access to each of the read areas and each of the write areas, wherein the first detecting means includes:

first address updating means for storing an access address whose initial value is a start address of the first region and for updating the access address, whenever the access means has read all data from one read area, to a start address of a remaining part of the first region;

first data size updating means for storing a remaining data size whose initial value is a data size of the first region and for updating the remaining data size, whenever the access means has read all data from one read area, to a data size of the remaining part of the first region; and read area detecting means for detecting a read area as an area from the access address to a next page boundary when the access address is set at the initial value and for otherwise detecting a read area as an area from the access address to either a next page boundary or the end of the first region to be accessed, and wherein the read area detecting means includes first size detecting means for detecting a size of an area from the access address in the first address updating means to either the next page boundary or the end of the first region and first size storing means for storing the detected area size as a size of the read area, wherein the access means performs high-speed page access to the area of the read area size in the first size storing means, starting from the access address in the first address updating means.

6. The DMA transfer device of claim 5, wherein the first size detecting means includes:

first subtracting means for subtracting a value, which is indicated by lower bits of the access address and shows a relative position of the access address within a page in the memory, from a page size of each page to produce a subtraction result;

first comparing means for comparing the subtraction result with the remaining data size in the first data size updating means to produce a comparison result; and first selecting means for selecting, based on the comparison result, one of the subtraction result and the remaining data size to give a smallest selection result, wherein the first size storing means stores the selection result as the read area size.

7. A DMA transfer device that transfers data from a first region to a second region in memories that allow high-speed page access, the DMA transfer device comprising:

first detecting means for detecting a plurality of read areas that form the first region, each read area being demarcated by a page boundary and one of: (1) a start of the first region; (2) an end of the first region; and (3) other page boundary;

second detecting means for detecting a plurality of write areas that form the second region, each write area being demarcated by a page boundary and one of: (1) a start of the second region; (2) an end of the second region; and (3) another page boundary;

buffer means for temporarily storing data to be transferred; and access means for performing high-speed page access to each of the read areas and each of the write areas, wherein the first region and the second region exist in either in a same memory or different memories connected to a same bus, wherein the access means includes read/write judging means for comparing a size of data in the buffer means with a size of a next write area and producing a judgement result showing whether a read from a next read area or a write into the next write area should be performed and access control means for performing either the read or the write according to the judgement result of the read/write judging means.

8. The DMA transfer device of claim 7, wherein the buffer means has a capacity at least as large as two pages minus one word of a memory and wherein if a free space in the buffer means is at least as large as the next read area, the read/write judging means judges that the read should be performed, and if the size of the data in the buffer means is at least as large as the next write area, the read/write judging means judges that the write should be performed.

9. A DMA transfer device that transfers data from a first region to a second region in memories that allow high-speed page access, the DMA transfer device comprising:

first detecting means for detecting a plurality of read areas that form the first region, each read area being demarcated by a page boundary and one of: (1) a start of the first region; (2) an end of the first region; and (3) other page boundary;

second detecting means for detecting a plurality of write areas that form the second region, each write area being demarcated by a page boundary and one of: (1) a start of the second region; (2) an end of the second region; and (3) another page boundary;

buffer means for temporarily storing data to be transferred; and access means for performing high-speed page access to each of the read areas and each of the write areas, wherein the buffer means is a two-port memory, one port being connected to one bus and the other port being connected to a different bus, wherein the first region and the second region exist in different memories connected to the different buses, and wherein the access means includes read/write judging means for judging from a size of data in the buffer means whether to perform a read from a next read area, and separately judging whether to perform a write into a next write area and access control means for performing the read and the write according to judgements of the read/write judging means.

10. The DMA transfer device of claim 9, wherein if a free space in the buffer means is at least as large as the next read area, the read/write judging means judges that the read should be performed, and if the size of the data in the buffer means is at least as large as the next write area, the read/write judging means judges that the write should be performed.

11. A DMA transfer system that accesses regions in a memory allowing high-speed page access and that has a plurality of DMA channels of different priorities, the DMA transfer system comprising:

a plurality of receiving means that are each provided to a different DMA channel, each receiving means receiving a DMA transfer request for one DMA channel and storing the DMA transfer request until a DMA transfer requested by the DMA transfer request is completed;

a plurality of detecting means that are each provided to a different DMA channel, each detecting means detecting a plurality of access areas that form one of the regions that is specified by a DMA transfer request corresponding to the detecting means, each access area being demarcated by a page boundary and one of: (1) a start of the region; (2) an end of the region; and (3) another page boundary;

a plurality of request generating means that are each provided to a different DMA channel, each request generating means generating a plurality of access requests that each indicate high-speed page access to one access area detected by a detecting means corresponding to the request generating means;

a buffer means that is shared by the plurality of DMA channels and that temporarily stores data to be transferred; and an arbitration means for: (1) performing, if only one DMA transfer request for one DMA channel is stored by one receiving means, high-speed page access according to access requests that have been generated corresponding to the DMA transfer request; (2) instructing, if a DMA transfer request for a DMA channel of a higher priority is received by one receiving means while a DMA transfer request of a lower priority is stored by another receiving means, a detecting means and a request generating means corresponding to the DMA transfer request of the lower priority to suspend processing once the buffer means is empty; (3) starting, once the buffer means is empty, the DMA transfer of the higher priority according to each access request; and (4) instructing, once the DMA transfer of the higher priority is completed, the detecting means and the request generating means whose processing was suspended to resume the processing.

12. The DMA transfer system of claim 11, wherein when instructed by the arbitration means to suspend the processing, the detecting means corresponding to the DMA channel of the lower priority detects a part in a region into which data in the buffer means should be written and wherein when instructed by the arbitration means to suspend the processing, the request generating means corresponding to the DMA channel of the lower priority generates an access request for the part detected by the corresponding detecting means and wherein the arbitration means performs access to the part according to the access request so that the buffer means becomes empty.

13. The DMA transfer system of claim 12, wherein when instructed by the arbitration means to resume processing, the detecting means corresponding to the DMA transfer of the lower priority detects at least one access area that form a remaining part of the region that has not been accessed for the DMA transfer request of the lower priority.

14. A DMA transfer system that accesses regions in memories allowing high-speed page access and that has a plurality of DMA channels, the DMA transfer system comprising:

a plurality of receiving means that are each provided to a different DMA channel, each receiving means receiving a DMA transfer request for one DMA channel and storing the DMA transfer request until a DMA transfer requested by the DMA transfer request is completed;

a plurality of detecting means that are each provided to a different DMA channel, each detecting means detecting a plurality of access areas that form one of the regions that is specified by a DMA transfer request corresponding to the detecting means, each access area being demarcated by a page boundary and one of: (1) a start of the region; (2) an end of the region; and (3) another page boundary;

a plurality of request generating means that are each provided to a different DMA channel, each request generating means generating a plurality of access requests that each indicate a high-speed page access to one access area detected by a detecting means corresponding to the request generating means;

a buffer means that is a two-port memory shared by the plurality of DMA channels and that temporarily stores data to be transferred, one port being connected to one bus and the other port connected to a different bus; and an arbitration means for performing, if only one DMA transfer request for one DMA channel is stored by one receiving means, a DMA transfer requested by the DMA transfer request according to access requests that have been generated corresponding to the DMA transfer request, and if a first DMA transfer request for a DMA channel is received by one receiving means while a second DMA transfer request is stored by another receiving means and a write region into which data should be written for the second DMA transfer request and a read region from which data should be read for the first DMA transfer request exist in different memories connected to the different buses, starting a read from an access area at a start of the read region after all data has been read from one region for the second DMA transfer request into the buffer means and a space having a same size as the access area in the read region has become available in the buffer means.

* * * * *

UNITED STATES PATENT AND TRADEMARK OFFICE
CERTIFICATE OF CORRECTION

PATENT NO. : 6,633,926 B1
DATED : October 14, 2003
INVENTOR(S) : Masaaki Harada et al.

It is certified that error appears in the above-identified patent and that said Letters Patent is hereby corrected as shown below:

Column 19,
Line 22, please delete the text of claim 2, and replace it as follows:
-- 2 The DMA transfer device of Claim 1,
    wherein the size detecting means includes:
    second subtracting means for subtracting a value, which is indicated by lower bits of the access address in the second address in the second address updating means and shows a relative positoin of the access address within a page in the memory, from a page size of each page to produce a subtraction result;
    comparing means for comparing the subtraction result with the remaining data size in the second data size updating means to produce a comparison result; and
    selecting means for selecting, based on the comparison result, one of the subtraction result and the remaining data size to give a smallest selection result,
    wherein the second size storing means stores the selection result as the write area size. --

Signed and Sealed this

Twenty-sixth Day of July, 2005

JON W. DUDAS
*Director of the United States Patent and Trademark Office*